TELEPHONE TRAFFIC CONCENTRATOR

Filed Aug. 10, 1962 15 Sheets-Sheet 1

INVENTORS
Pierre M. Lucas + Jean F. Duquesne
BY Abraham A. Saffitz
ATTORNEY

INVENTORS

Pierre M. Lucas + Jean F. Duquesne

BY Abraham A. Saffitz

ATTORNEY

INVENTORS
Pierre M. Lucas & Jean F. Duquesne
BY Abraham A. Saffitz
ATTORNEY

INVENTORS
Pierre M. Lucas + Jean F. Duquesne
BY Abraham A. Saffitz
ATTORNEY

TELEPHONE TRAFFIC CONCENTRATOR

Filed Aug. 10, 1962

INVENTORS
Pierre M. Lucas + Jean F. Duquesne
BY Abraham A. Saffitz

Sept. 14, 1965 P. M. LUCAS ETAL 3,206,553
TELEPHONE TRAFFIC CONCENTRATOR
Filed Aug. 10, 1962
15 Sheets-Sheet 6

INVENTORS
Pierre M. Lucas & Jean F. Duquesne
BY Abraham A. Saffitz
ATTORNEY

TELEPHONE TRAFFIC CONCENTRATOR

Filed Aug. 10, 1962 15 Sheets-Sheet 7

INVENTORS
Pierre M. Lucas & Jean F. Duquesne
BY Abraham A. Saffitz
ATTORNEY

INVENTORS
Pierre M. Lucas & Jean F. Duquesne
BY Abraham A. Saffitz
ATTORNEY

INVENTORS
Pierre M. Lucas & Jean F. Duquesne
By Abraham A. Saffitz
ATTORNEY

Sept. 14, 1965 P. M. LUCAS ETAL 3,206,553

TELEPHONE TRAFFIC CONCENTRATOR

Filed Aug. 10, 1962 15 Sheets-Sheet 10

INVENTORS

Pierre M. Lucas + Jean F. Duguesne

By Abraham A. Saffitz

ATTORNEY

INVENTORS
Pierre M. Lucas & Jean F. Duquesne
By Abraham A. Saffitz
ATTORNEY

INVENTORS
Pierre M. Lucas & Jean F. Duquesne
By Abraham A. Saffitz
ATTORNEY

Sept. 14, 1965 P. M. LUCAS ETAL 3,206,553

TELEPHONE TRAFFIC CONCENTRATOR

Filed Aug. 10, 1962 15 Sheets-Sheet 13

INVENTORS

Pierre M. Lucas & Jean F. Duquesne

By Abraham A. Saffitz

ATTORNEY

INVENTORS
Pierre M. Lucas
Jean F. Duquesne
By Abraham A. Saffitz
ATTORNEY

INVENTORS
Pierre M. Lucas & Jean F. Duquesne
By Abraham A. Saffitz
ATTORNEY

United States Patent Office 3,206,553
Patented Sept. 14, 1965

3,206,553
TELEPHONE TRAFFIC CONCENTRATOR

Pierre M. Lucas, 20 Rue Tariel, Issy-les-Moulineaux, France, and Jean F. Duquesne, 41 Rue Esquirol, Paris, France Filed Aug. 10, 1962, Ser. No. 216,126
Claims priority, application France, Aug. 28, 1961, 871,788
4 Claims. (Cl. 179—18)

This invention relates to a telephone traffic concentrator to which a number of subscribers are connected and which is connected to a central telephone station by a number of trunks there being considerably fewer central telephone station trunks than there are subscribers connected to the concentrator. More particularly, this invention relates to a concentrator of the independent connection type controlled by code signals.

Concentrators of the independent connection type controlled by code signals are known in the prior art. More particularly, U.S. Patent 2,979,571 issued April 11, 1961 in the names of Louis J. Libois and Pierre M. Lucas discloses such a concentrator comprising an electronic crosspoint matrix. Such concentrators are known as "independent connection concentrators," since the line of an originating or terminating subscriber is connected to one of the trunks chosen on a random basis by the concentrator amongst the trunks which can be connected to the particular subscriber's line concerned via the switching network. Concentrators of this kind are said to be "code basis controlled," since the subscribers' line numbers and the trunk line numbers which have been connected to one another or which are required to be disconnected from one another are transmitted on a code basis by binary digits.

It is an object of this invention to provide a code basis controlled concentrator wherein the switching network is formed by a two-stage crossbar switching arrangement such as is disclosed in United States patent specification No. 2,585,904 which was granted to A. J. Busch on Feb. 19, 1952. It is another object of the invention to provide a code basis controlled traffic concentrator which includes means for identifying a subscriber's line when connected to a given trunk, these identifying means being operative on connection and on disconnection.

It is another object of the invention to provide a code basis controlled concentrator, the code signals being selected from a code enabling the received code numbers to be verified, the concentrator preforming the connections, identifications and disconnections which it is ordered to perform only after the code numbers corresponding to the various operations have been verified.

It is another object of the invention to provide a telephone concentrator where the crossbar switching network and the electromechanical control system therefor is electrically decoupled from the electronic means for receiving and transmitting the code signals and for controlling the electromechanical part, thus ensuring that excess voltages produced when the energizing current for the relays in the electromechanical part is interrupted do not damage the electronic side of the equipment, particularly the electronic amplifiers.

According to the main feature of the invention, the signals of a verifiable code which are intended to denote the numbers of the subscribers' lines and of the trunks are received and transmitted by electronic address registers formed by a number of binary storage circuits; the binary digits registered in the storage circuits are gated to decoding relays corresponding to respective memory circuits; the binary digits registered in the decoding relays are gated after decoding to marking relays; decoding comprises supplying a predetermined marking relay through "make-contacts" of decoding relays which are represented by the binary digit 1 and through "break-contacts" of decoding relays which are represented by the binary digit 0 in the code of this predetermined marking relay as registered in the decoding relays; and the marking relays operate the electromagnets of the two-stage crossbas switching network.

According to another feature of the invention, the code used for the transmission of the subscribers' line numbers and the trunk numbers is a binary code consisting of the numbers having an equal number of 0 digits and of 1 digits of the "N amongst 2N" kind. The marking relay energizing circuits which include the "make" and "break-contacts" of the decoding relays also include in series a verifying circuit which is formed by these "make" and "break-contacts" of the decoding relays and which is closed only when N decoding relays are in the operative state and N decoding relays are in the inoperative state.

According to another feature of the invention, the electronic memory circuits are connected to the decoding relays through power amplifiers which operate only for brief periods of about 10 milliseconds to energize the decoding relays, and the concentrator comprises means for disconnecting the decoding relays from their associated power amplifiers, so that the decoding relays are energized briefly through their associated power amplifiers but are de-energized by their holding circuit being interrupted at a time when they are disconnected from their amplifiers. Thus the amplifiers are protected against excess voltages produced at release.

According to another feature of the invention, the subscribers' line and trunk registers are registers comprising a main sub-register and an auxiliary sub-register, such registers counting in an "N amongst 2N" binary code and retaining in the sequence of binary numbers only those which have an equal number of 0 digits and of 1 digits and comprising means for displaying in the main register, under the action of a stepping-on signal, that number of the "N amongst 2N" binary code which is consecutive to the number contained in the auxiliary sub-register.

These and other features of the invention will be more clearly understood from the consideration of the following description in connection with the drawings, in which.

Figure 7:
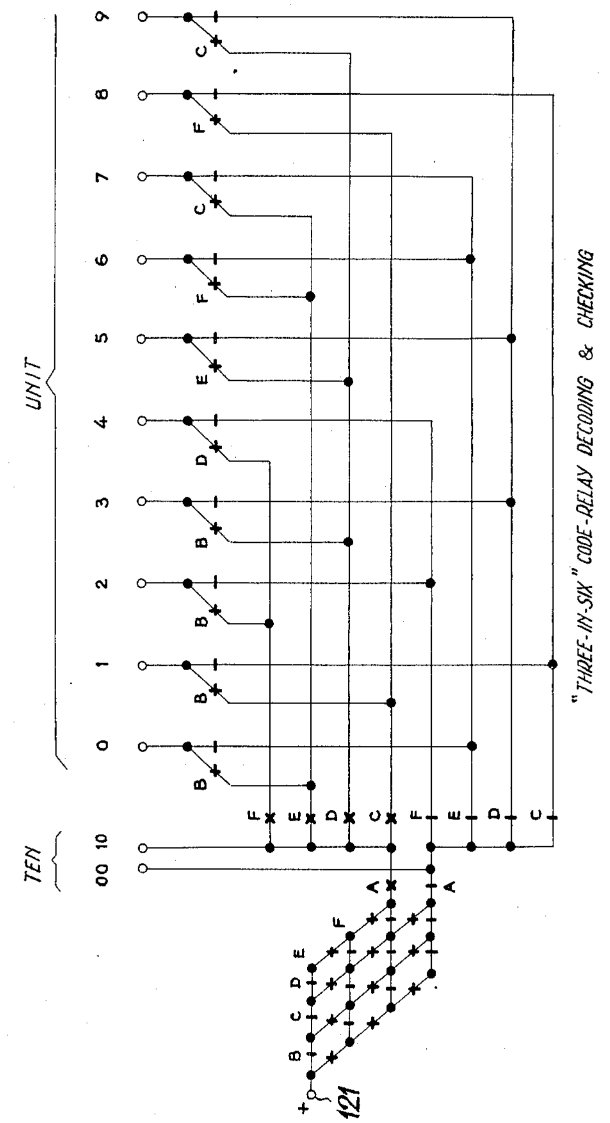
Figure 8A:
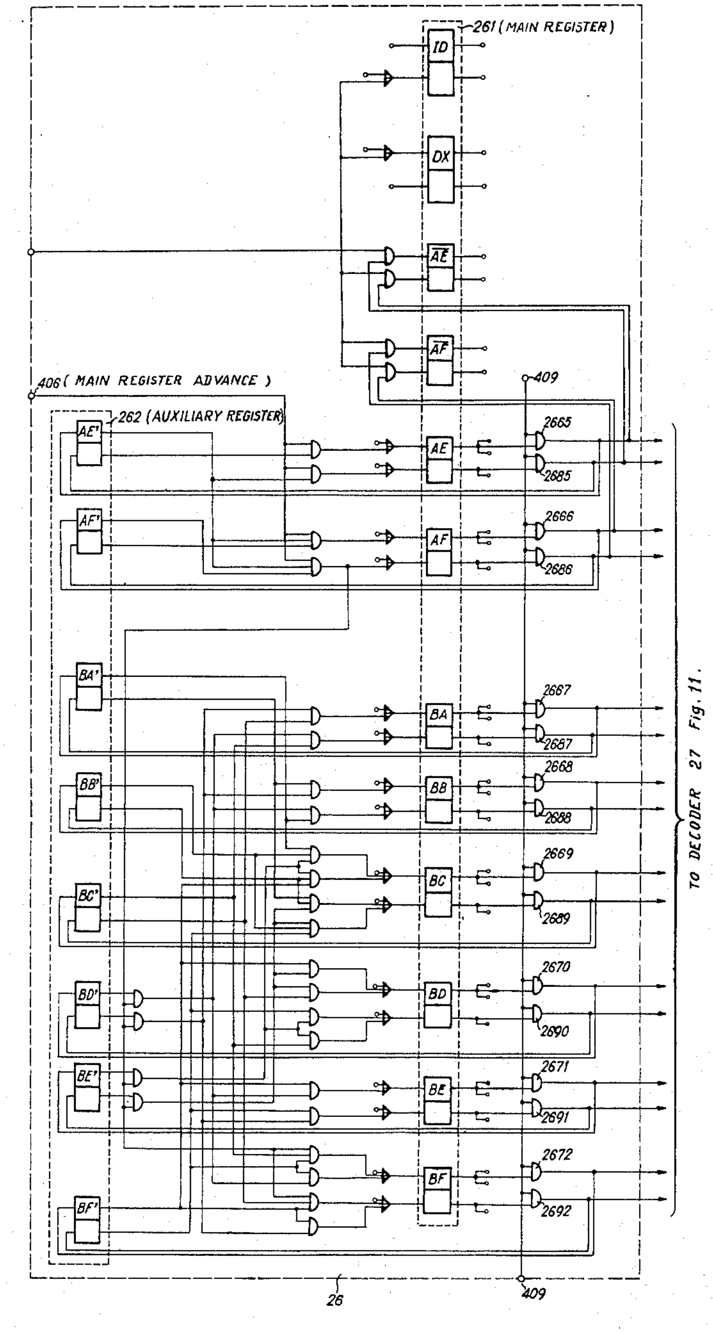
Figure 8B:
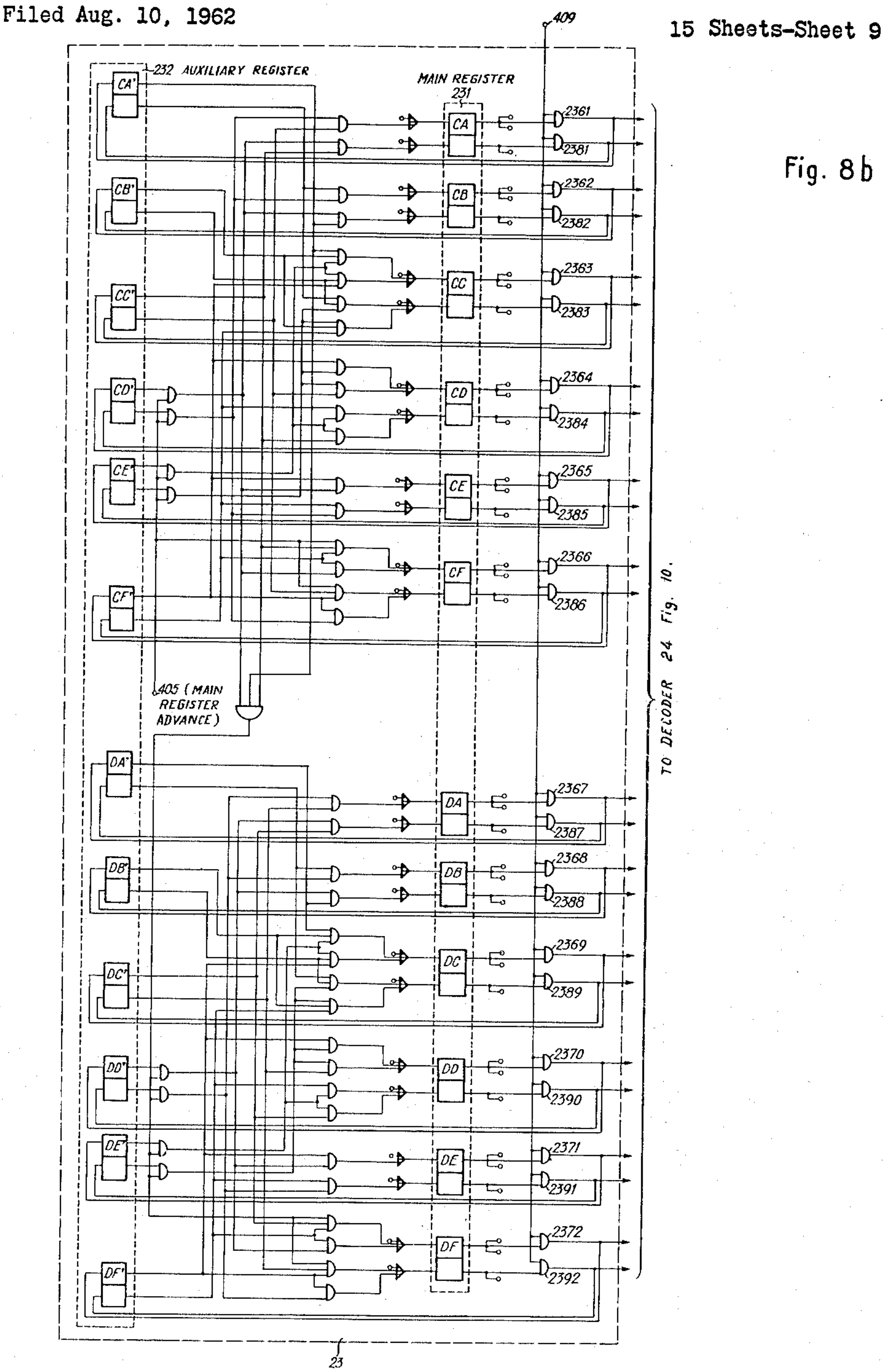
Figure 9A:
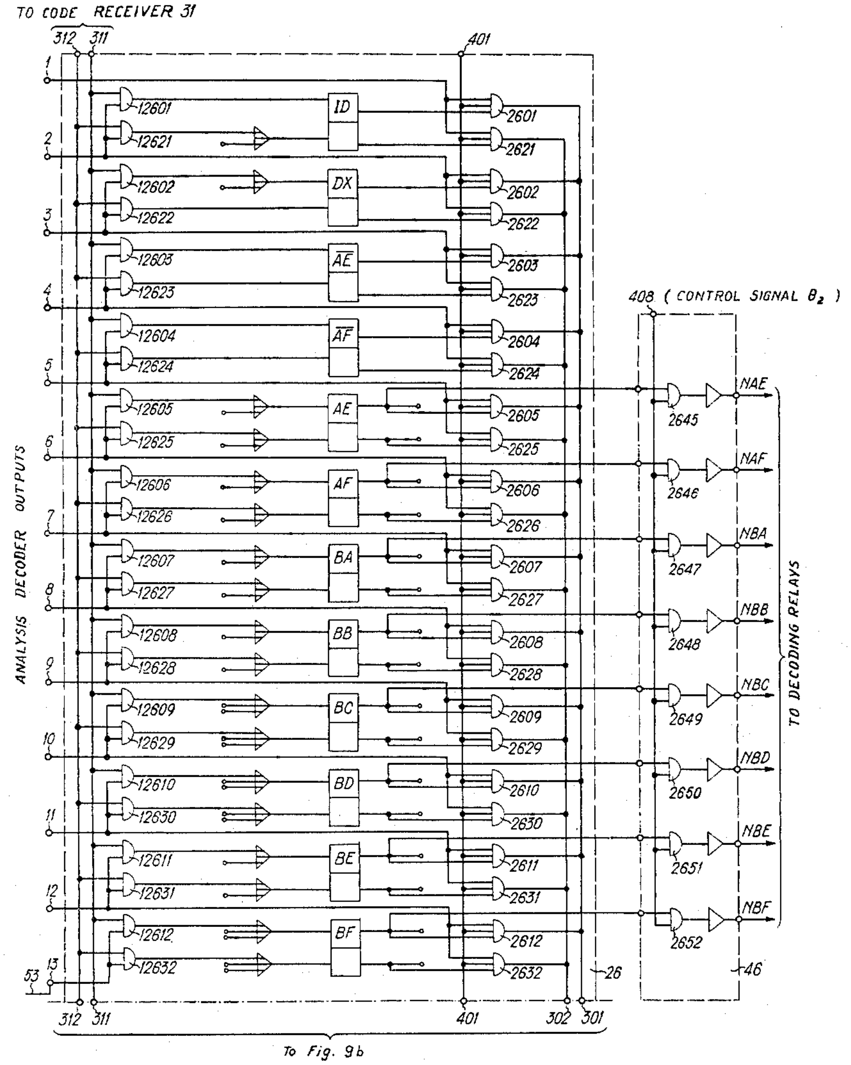
Figure 9B:
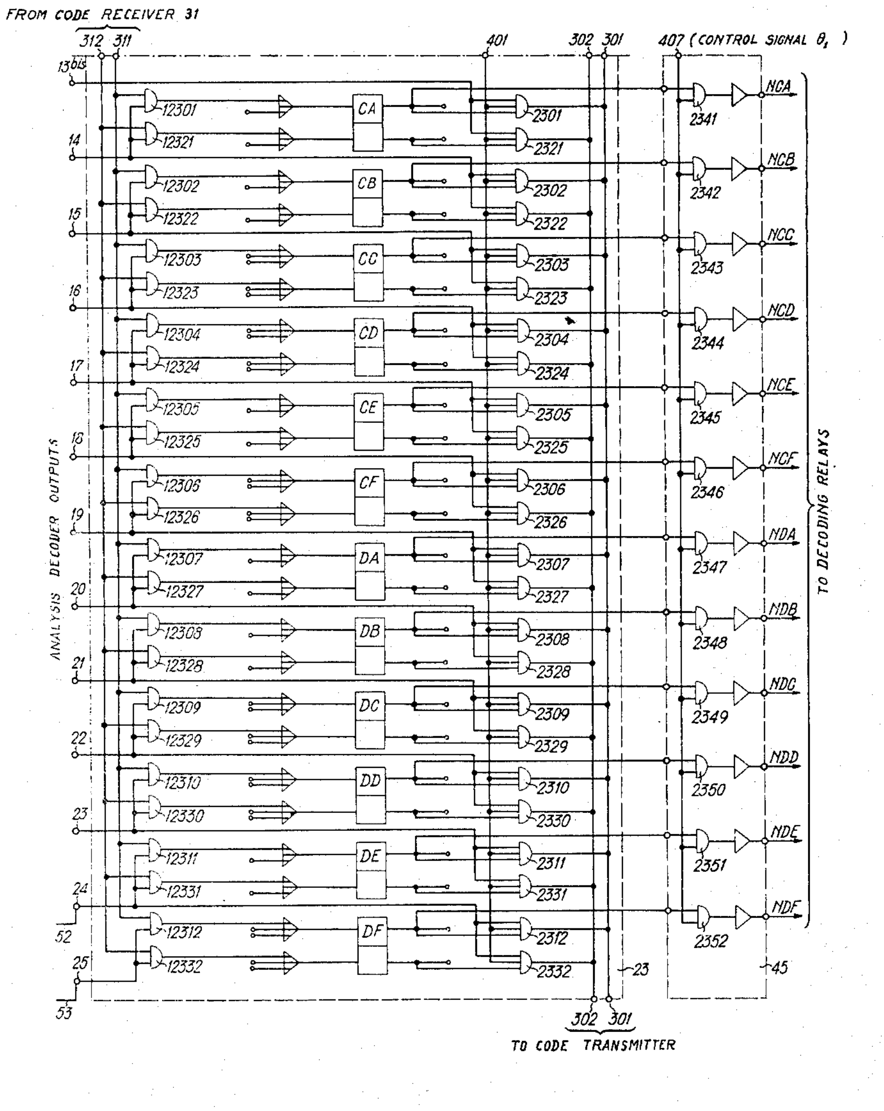
Figure 10:
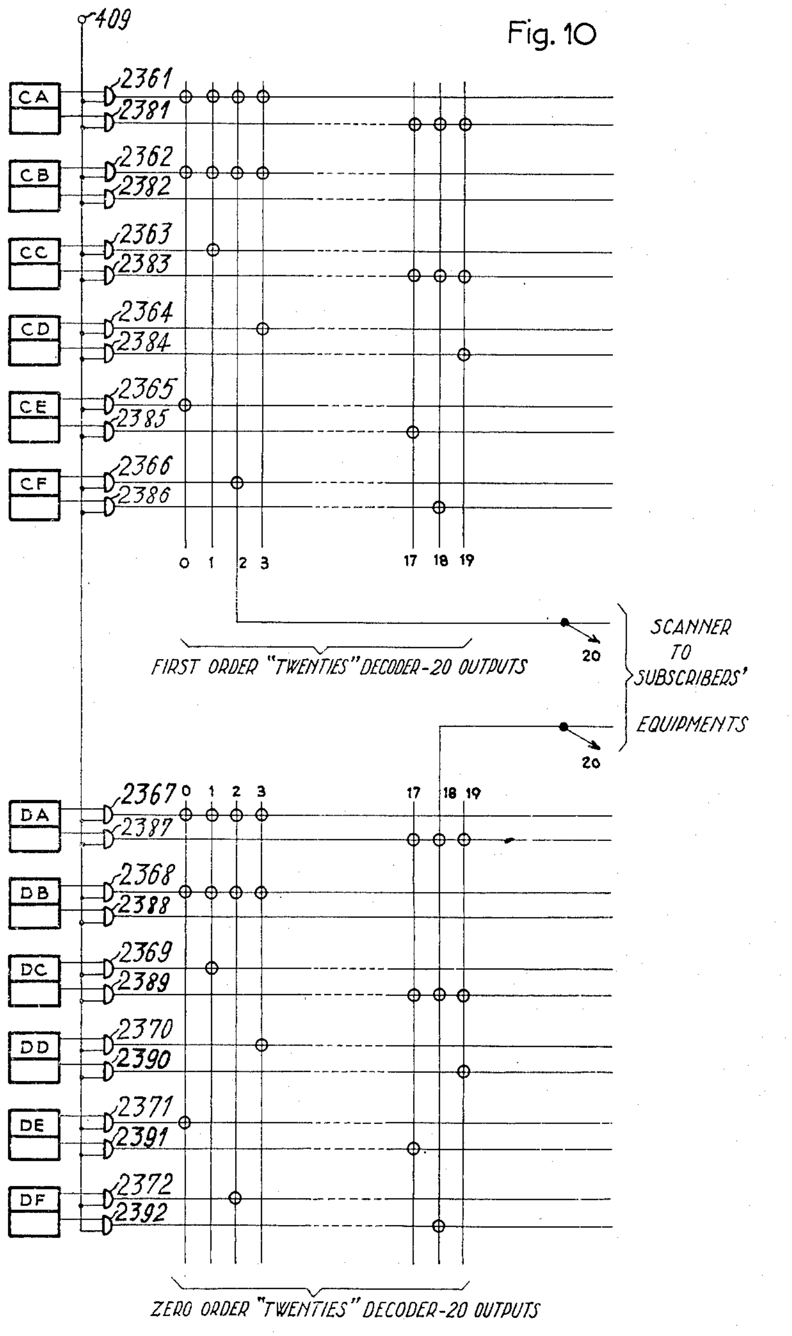
Figure 11:
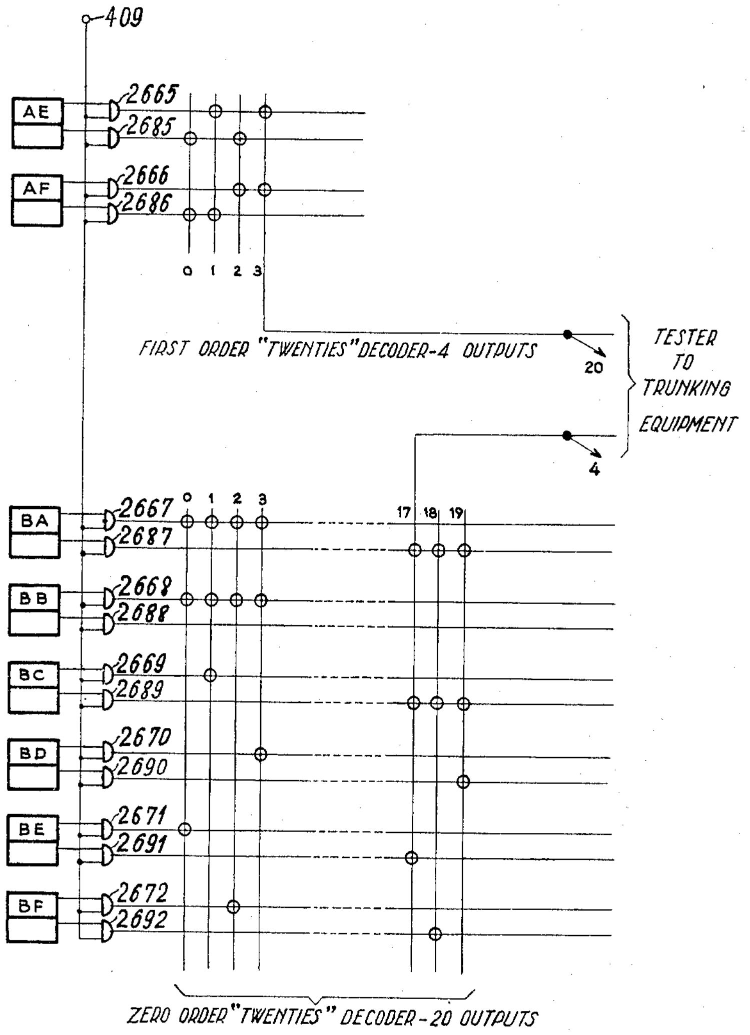
Figure 12:
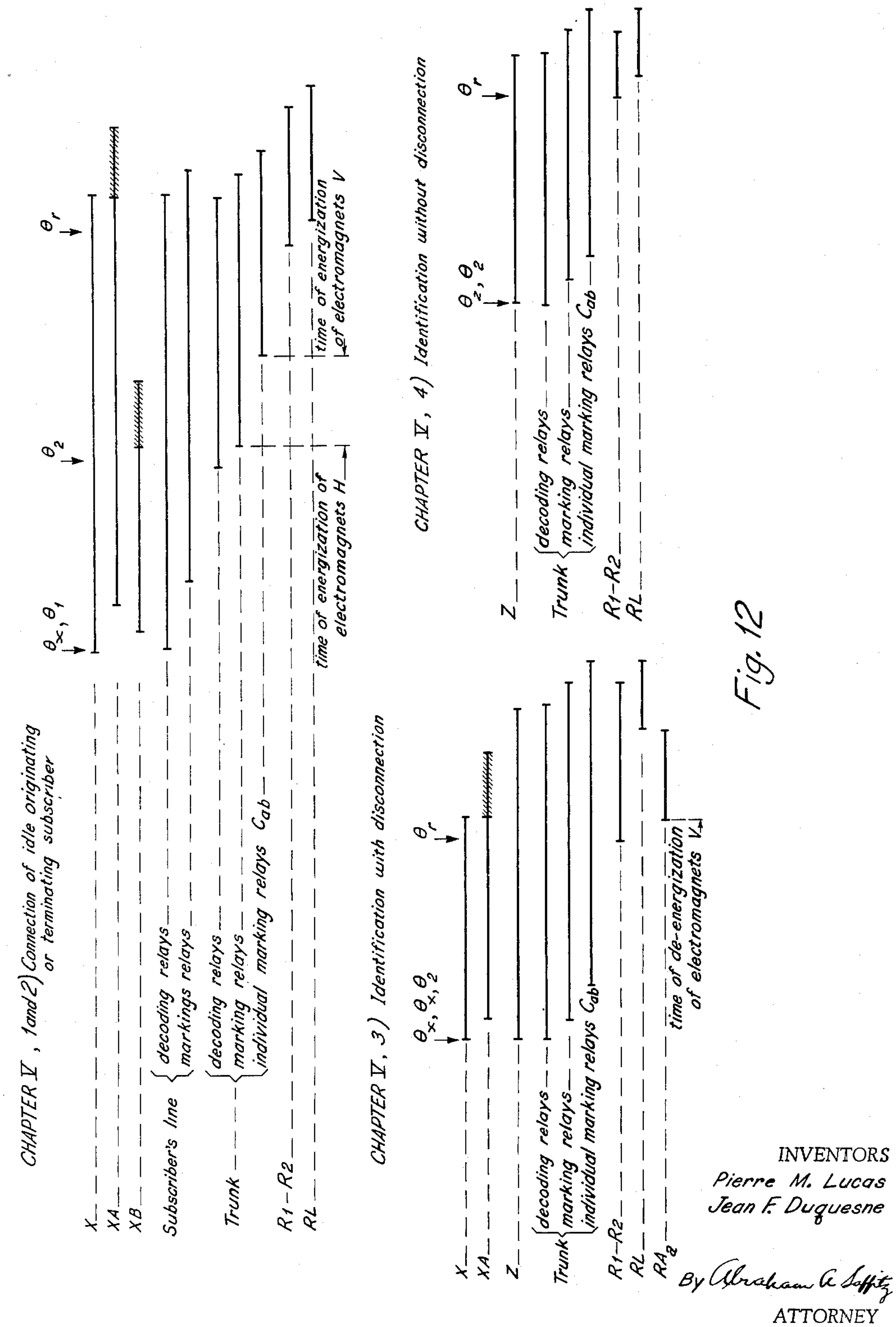
Figure 13:
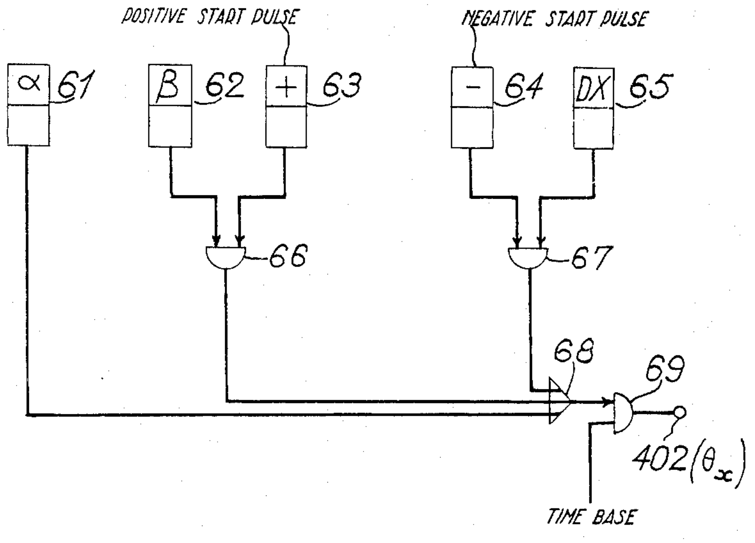

FIG. 7 diagrammatically illustrates the decoding of the "three amongst six" code by means of six relays;

FIGS. 8*a* and 8*b* illustrate the subscribers' line and trunk registers with respect to their stepwise advance and their connection to electronic decoders adapted to scan subscribers' lines and to test the trunks;

FIGS. 9*a* and 9*b* illustrate the subscribers' line and trunk registers with respect to reception of codes from the central telephone station, transmission thereto and gating to the decoding relays;

FIG. 10 illustrates an electronic decoder for scanning the subscribers' lines;

FIG. 11 illustrates an electronic decoder for testing trunks;

FIG. 12 is a diagram showing the pull-on times of the relays of the electromechanical part; and FIG. 13 diagrammatically illustrates part of the programmer included in the concentrator according to the invention.

CHAPTER I.—GENERAL ORGANIZATION

Figure 1:
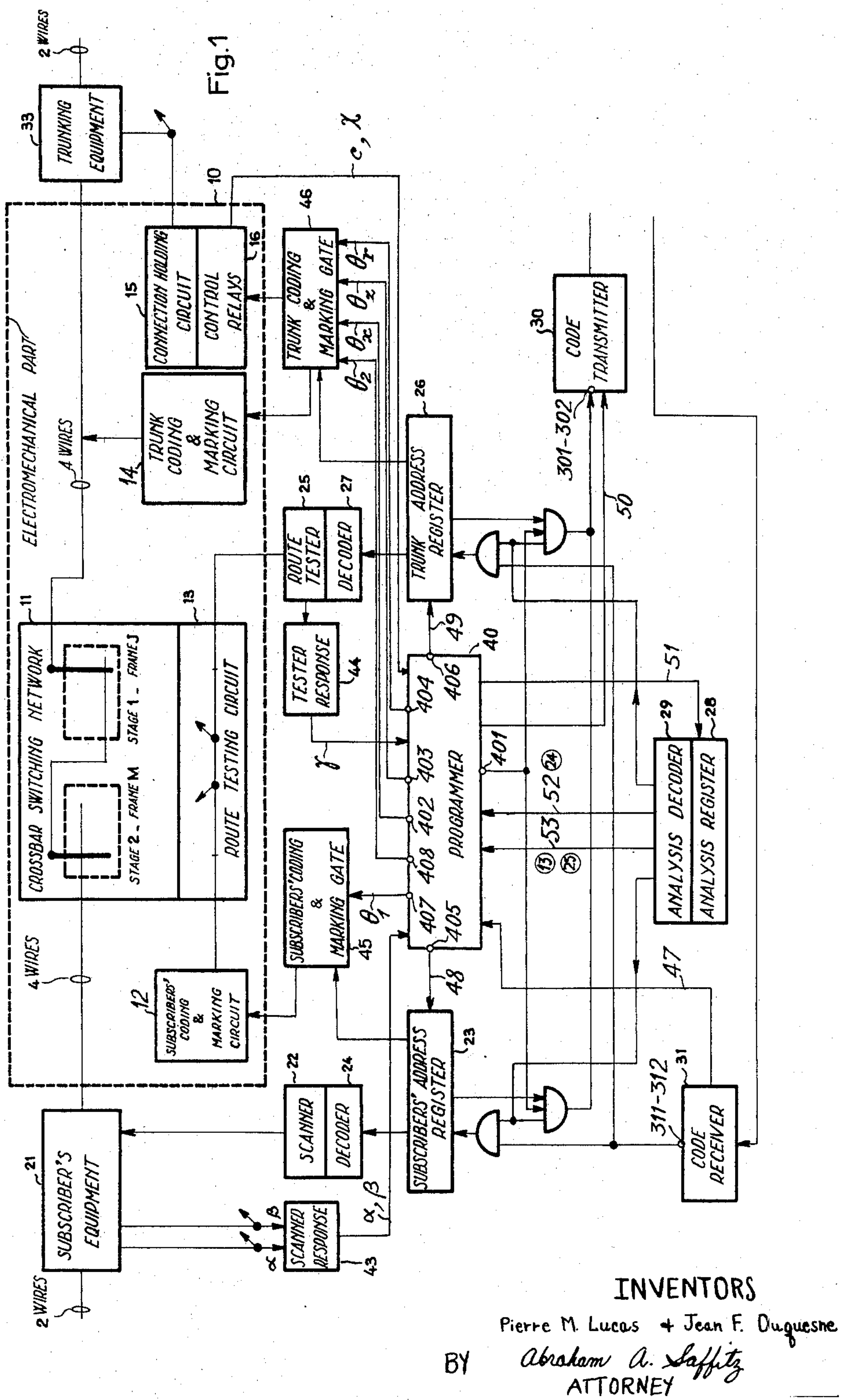
FIG. 1 is a block schematic diagram of the telephone concentrator according to the invention.

The concentrator has two main parts—an electromechanical part, included in a broken-line rectangle 10 in FIG. 1, and an electronic part, comprising all of those rectangles in FIG. 1 which are outside the rectangle 10.

The electromechanical part comprises a two-stage crossbar switching network 11; a circuit 12 for decoding and marking subscribers' lines; a route testing circuit 13; a trunk decoding and marking circuit 14; a joint circuit 15 for holding existing connections; control relays 16 associated with the holding circuit 15.

The electronic part comprises subscribers' line equipments, only a single one 21, of which is shown; a subscribers' line scanner 22; a subscribers' register 23 controlling the scanner 22 and the decoding and marking circuit 12; a decoder 24 associated with the subscribers' register 23 and the scanner 22; a route tester 25; a trunk register 26 controlling the tester 25 and the trunk decoding and marking circuit 14; an analysis register 28; an analysis decoder 29 associated with the analysis register 28 and used whenever it is required to translate the "series" code used for transmission between the central station and the concentrator into the "parallel" code, this code being used in the subscribers' address register 23 and trunk address register 26 and vice versa; a code transmitter 30; a code receiver 31; trunk equipments, only one, 33, of which is shown; a programmer 40; a responder circuit 43 for the scanner 22; a responder circuit 44 for the tester 25; a control circuit 45 for marking subscribers' lines; and a control circuit 46 for marking trunks.

CHAPTER II.—ELECTROMECHANICAL PART

II. 1 *Switching network.*—The two-stage switching network according to the invention is a conventional switching network comprising crossbar switches. In the example described, the crossbar switches comprise ten columns and twelve rows each column comprising a hold electromagnet V, and each row comprising a select electromagnet. The last two rows are used as splitting bars and their select electromagnets are labeled H*dr*, H*ga*, these letters being employed to denote the splitting rows and no additional references to the corresponding steering magnets being provided since it is not intended to contribute to the proliferation of references. The use of splitting is conventional and transforms a 10 x 12 capacity crossbar switch, in which each crosspoint comprises a stack, for instance, of eight metal contacts operated simultaneously, into a 10 x 20 capacity crossbar switch in which the crosspoint is formed by one-half of the stack just mentioned—i.e., by four contacts. A splitting organization of a crossbar switch is for example disclosed in "The Design for Switching Circuits," by William Keister, Alistair E. Ritchie and Seth H. Washburn, pages 198–199 and FIG. 9.26.

Each of the two halves of the operated stack is denoted by the stack of the connection point disposed on the same column at the intersection of one or other of the doubler rows H*dr* or H*ga*, so that to provide a connection between any of the ten columns and any of the twenty outlets two stacks of contacts disposed in the same column must be connected in series, one such stack corresponding to one of the doubler rows H*dr* or H*ga* and the other corresponding to one of the ordinary rows. Consequently, before a connection can be made, two row electromagnets must operate prior to operation of the column electromagnet which holds the connection.

To build up from such 10 x 20 crossbar switches a two-stage concentrator serving 400 subscribers via 60 trunks (assuming a traffic of about 35 erlangs with a 1% loss probability) eighteen crossbar switches are required distributed into three frames of six switches—two line link frames hereinafter referred to as the left line link frame M*g* and the right line link frame M*d*, and a trunk link frame hereinafter referred to as J.

The sixty trunks terminate individually at the column inputs of the six switches of trunk link frame J. The crosspoints of switches J are multipled horizontally so that there are twenty outputs—ten to frame M*g* (denoted by the doubler row H*ga* and one of the ten normal rows) and ten to frame M*d* (denoted by the doubler row H*dr* and one of the ten ordinary rows). Every output on the crossbar switches of frame J is connected through a link to a column of the crossbar switch of like rank of a line link frame M. The subscribers' lines are connected to the exits of the crossbar switches of the frames M. Since by virtue of the doubler principle each crossbar column can be connected to twenty exits, and since the exits of any single crossbar switches are not multipled as between themselves, each line link frame crossbar switch has two hundred exits. Like exits of the six switches of the same line link frame M are multipled as between themselves and connected to a subscriber's line, and so each of the two frames M serves two hundred subscribers' lines and each subscriber's line can be connected via six different crosspoints to six different links.

Each subscriber's line in a group of four hundred is defined by three digits—a hundreds digit, a tens digit and a units digit. Multipling is such that the left-hand line link frame M*g* serves the first two hundreds (for instance, 1 and 2) and the right-hand line-link frame M*d* serves the last two hundreds (3 and 4). In each frame M, if a connection has been established using the doubler electromagnet H*ga* and some other electromagnet, for instance, H*u*, the subscribers served will be those of the odd hundred (for instance, 1 or 3) and, in such hundred, those whose units number is *u*. If the link used is the one connecting the column of rank *d* of line link frame M to the row output of rank *d* of the switch of same order of trunk link frame J, the subscribers served are those having the tens digit *d*.

Other kinds of multipling are possible. In particular, there may be advantages in using the known multipling transposition principle in which a subscriber's line having *d* as its tens digit and *u* as its units digit, instead of being connected as just described by using a column electromagnet of rank *d* and a horizontal electromagnet of rank *u* of any crossbar switch of line link frame M, is connected in this way only by the crossbar switches of the top half of frame M, while the switches of the bottom half thereof connect such subscriber's line by means of a column electromagnet of rank *u* and of a row electromagnet of rank *d*. This arrangement, of course, helps to lessen the probability of internal blocking of the connecting network.

If a traffic intensity of 35 erlangs with a 1% loss probability is considered inadequate, one or two extra crossbar switches can readily be added to each frame, in which event the outputs of the switches of the frame M are still multipled as between one another from switch to switch, and the vertical inputs of the extra switches of frame J are connected to the same number of extra trunks. The traffic intensity for the same loss probability of 1% and with seven switches per frame would then be about 45 erlangs, and with eight switches per frame about 56 erlangs.

Figure 2:
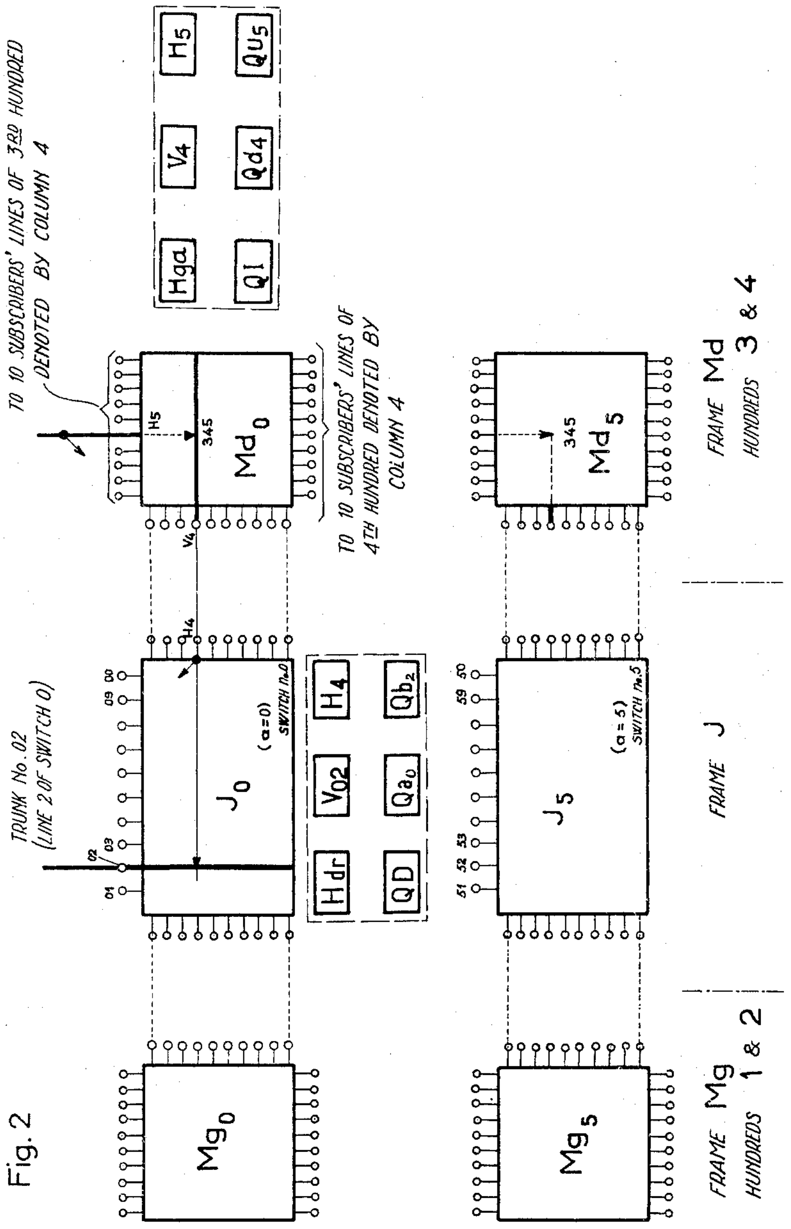
FIG. 2 shows the organization and multipling of the subscribers' lines in a two-stage crossbar switching network.

The foregoing shows that:

(A) Defining a trunk (*ab*) is a matter of knowing the rank of that crossbar switch of the frame J where such trunk is disposed (let *a* be such rank) and of knowing the rank of that column of the same crossbar switch where the trunk is connected (let $b$ be such rank). As can be seen in FIG. 2, trunk 02 is connected to the second column input ($b=2$) of the first switch ($a=0$) of frame J.

(B) To define a subscriber's line means giving the hundreds, tens and units digits ($cdu$) of such line. The hundreds digit can conveniently be defined by indicating whether the hundred is odd or even and whether it is in the left-hand frame M*g* or the right-hand frame M*d*. $d$ and $u$ are the tens and units digits respectively, and $c_1$, $c_2$ are two binary numbers defining the hundred, $c_1$ denoting odd-even and $c_2$ denoting left or right. It may also be said that digits $d$ and $c_1$ form a first twenties digit and $u$ and $c_2$ a second twenties digit.

To connect a subscriber's line ($c_1$, $c_2$, $d$, $u$) to a trunk ($a$, $b$) there is only one route, and it corresponds to the following electromagnets:

In frame J, column electromagnet $V_{ab}$ of rank $b$ of the crossbar switch of rank $a$ on the frame, doubler now electromagnet: H*ga* if $c_2=1$; H*dr* if $c_2=0$; ordinary row electromagnet H*d* of rank $d$.

In frame M, column electromagnet V*d* of rank $d$ of the crossbar switch of rank $a$ on the frame, doubler row doubler electromagnet: H*dr* if $c_1=0$ (even hundred); H*ga* if $c_1=1$ (odd hundred); ordinary row electromagnet $H_u$ of rank $u$.

As can be seen in FIG. 2, the connection of trunk 02 and subscriber's line 345 requires the following electromagnets: In frame J, $V_{02}$, H*dr*, $H_4$; in frame M*d*, $V_4$, H*ga*, $H_5$.

If the number $a$ denotes the crossbar switches belonging to the bottom part of each frame J, the allotments of the digits $d$ and $u$ must be permutated in cases where multipling transposition is used.

Figure 3:
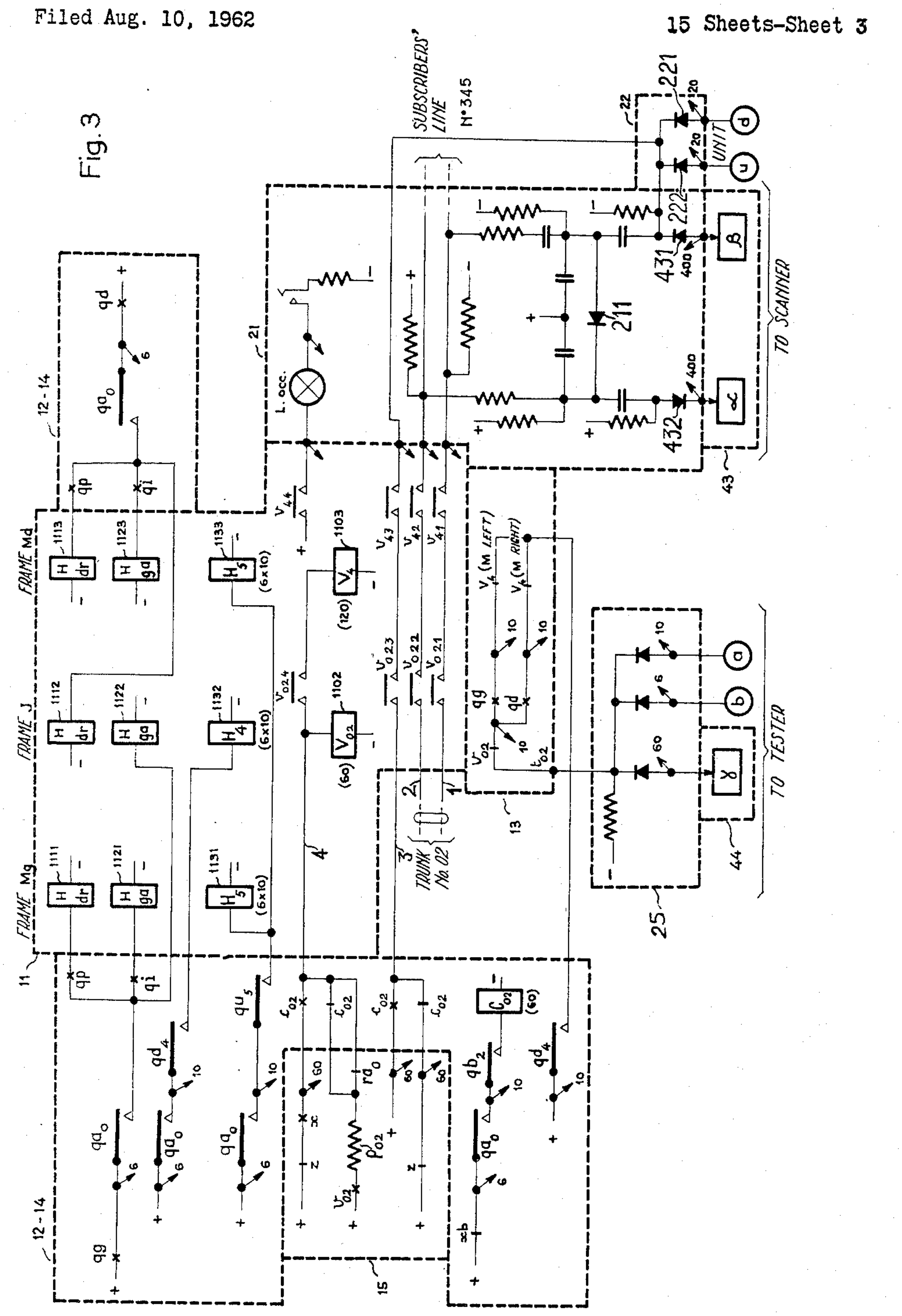
FIG. 3 illustrates the electromagnets of the crossbar switching network and shows how such electromagnets are controlled by the marking relays.
Figure 4:
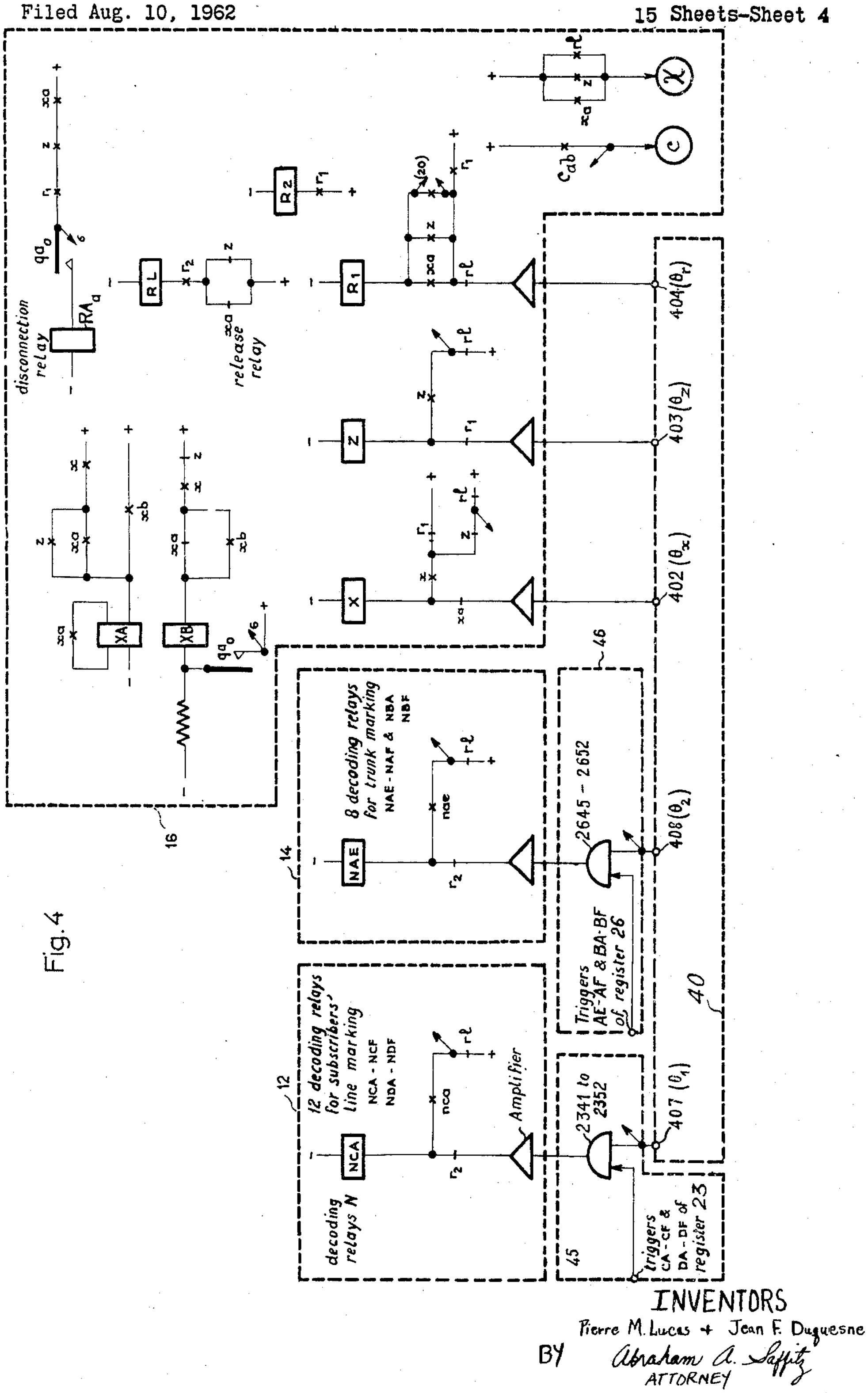
FIG. 4 shows how the decoding relays are controlled by the registers of the electronic side of the apparatus.
Figure 5:
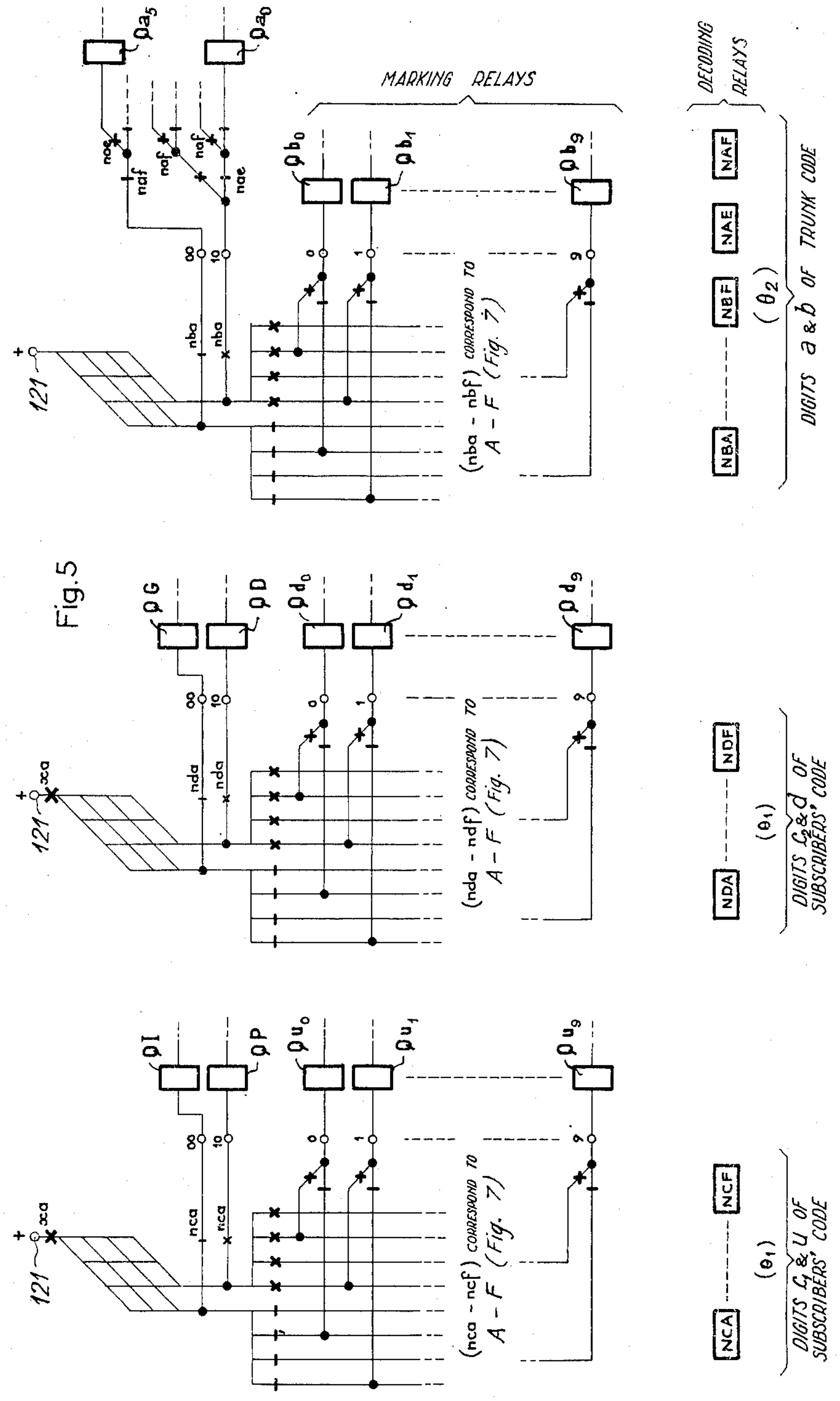
FIG. 5 shows how the marking relays are controlled by the decoding relays, the control being effected with verification of the codes.

II. 2 *Control of connecting network.*—FIG. 3 illustrates the electromechanical part of the concentrator and shows how the electromagnets V and H of the crossbar switch networks are controlled by the marking relays. The control of the decoding relays by the electronic registers is illustrated in FIG. 4 and the control of the marking relays by the decoding relays is illustrated in FIG. 5. There can be seen row electromagnets H*dr* 1111, 1112, 1113, row electromagnets H*ga* 1121, 1122, 1123, of each of the frames M*g*, J, M*d* and row electromagnets $H_d$ 1132 of the frame J and $H_u$ 1131 and 1133 of the frames M*d* and M*g*. Also visible is a column electromagnet $V_{ab}$ 1102 of frame J and a column electromagnet $V_d$ 1103 of a frame M. The route which is assumed to be set up is the route connecting trunk $ab$ to subscriber's line $c_1$, $c_2$, $d$, $u$ ($c_1=1$, odd hundred; $c_2=1$, frame M*g*, $d$, tens, $u$, units) via the link of rank $d$ of the switch of rank $a$. The link has four wires—two speech wires 1 and 2 which connect the wires of the subscriber's line to the wires of the trunk, a third wire 3 which shows that the line is busy or which identifies the subscriber, and a fourth wire 4 which serves to hold the column electromagnets used in the connection. To establish a connection, first the appropriate row and then the appropriate column electromagnets are energized, the circuit of these electromagnets being closed by contacts of marking relays Q.

As already stated, neither the electromagnets H and V of the crossbar switches nor the marking relays Q are controlled directly by the electronic part but are controlled through the agency of a very reduced number of decoding relays N (FIG. 4), namely NAE and NAF, NBA to NBF which provide a code marking of the trunk, and NCA to NCF, NDA to NDF which provide a code marking of the subscriber's line—i.e., a total of twenty relays in the example selected.

As can be seen in FIG. 4, the circuits through which the electromechanical part is controlled by the electronic part of the concentrator are limited to twenty-three—i.e., the twenty circuits controlling the decoding relays N, and three circuits controlling relays X, Z and $R_1$ which serve to define the operation to be performed, as will be seen hereinafter.

The marking relays Q are between the decoding relays N and the electromagnets H and V of the switches and are:

- The marking relays for trunk $ab$, namely: the relays Q$a_0$ to Q$a_5$ which are controlled by NAE, NAF and NBA and which define the rank $a$ of the switches.
- The relays Q$b_0$ to Q$b_9$ controlled by NBA to NBF and defining the rank of the column $b$.
- Individual relays $C_{ab}$ controlled by the series contacts of the relays Q$a$ and Q$b$.
- The marking relays of the subscriber's line ($c_1$, $c_2$, $d$, $u$), namely: the odd-even hundreds relay QP, QI, and the left-right relays QG, QD controlled by NCA and NDA and defining the doubler row electromagnets and the particular frame M*g* or M*d* to which the subscriber's line is connected.
- Tens relays Q$d_0$ to Q$d_9$ and units relays Q$u_0$ to Q$u_9$ controlled by NCA to NCF and NDA to NDF.

Assuming for the moment that the electronic part has defined, by register 23 and by means of trigger stages CA–CF and DA–DF, a subscriber's number and, by the register 26 and by means of trigger stages AE–AF and BA–BF, a trunk number, and that a connection is required between the subscriber's line and the trunk, it will be seen hereinafter that the electronic part transmits control signals first to relays NCA–NCF and NDA–NDF in accordance with the subscriber's code, and also to relay X, so that the marking relays QP or QI (even or odd), QG or QD (left or right), Q$d$, Q$u$ required for route testing can be energized, as can the auxiliary relays which depend upon the relays X, XA and XB. The electronic part then transmits control signals to relays NAE–NAF and NBA to NBF in accordance with the code of the trunk selected, so that the marking relays Q$a$, Q$b$ which define the trunk are energized.

FIG. 3 shows how the row electromagnets of the crossbar switches are controlled by way of the marking relays Q. For instance, if Q$a_0$, Q$b_2$, QP (even hundred) and QD (right-hand hundred of orders 3 and 4) are in operation together with Q$d_4$ and Q$u_5$, the electromagnet H*dr* 1112 of frame J is energized by a circuit extending from ground, contact $qd$ ($qd$=contact of relay QD), contact $qa_0$ ($qa_0$=contact of relay Q$a_0$), winding of H*dr* 1112 and battery. The electromagnet $H_4$ 1132 of frame J is energized via a circuit extending from ground, contact $qa_0$, contact $qd_4$ ($qd_4$=contact of relay Q$d_4$), winding of $H_4$ 1132 and battery. The electromagnet H*dr* 1113 of frame M*d* is energized via a circuit extending from ground, $qd$, $qa_0$, $qp$, winding of H*dr* 1113 and battery. The electromagnet $H_5$ 1113 of frame M*d* is energized via a circuit extending from ground, contact $qa_0$, $qu_5$ ($qu_5$=contact of relay Q$u_5$), winding of $H_5$ 1133 to the battery. The row electromagnets H*dr* 1112, $H_4$ 1132, H*dr* 1113, $H_5$ 1133 are therefore all energized.

Shortly after this marking, the relay XB which was energized in the foregoing manner through contact $z$, contact $x$ and contact $xa$ and which was being held by contact $xb$, is short-circuited by contact $qa_0$ (FIG. 4) and then drops. The individual marking relay $C_{02}$ of the trunk picks up (FIG. 3) by way of a circuit comprising ground, contact $xb$, contact $qa_0$, contact $qb_2$, winding of $C_{02}$ and battery. Since relay X is operative in this case, the column electromagnet $V_{02}$ of frame J picks up via a circuit comprising ground, break contact $z$, make contact $x$, make contact $c_{02}$ ($c_{02}$=contact of relay $C_{02}$), winding of $V_{02}$ 1102, and battery. The contacts $v_{021}$, $v_{022}$, $v_{023}$, $v_{024}$ of electromagnet $V_{02}$ close and, the marking being prolonged by way of the wire 4 of the link by the contact $V_{024}$, such closure enables column electromagnet $V_4$ 1103 of frame M*d* to pick up and thus terminates the connection.

The connection thus established is held by column electromagnet $V_{02}$ by means of make contact $V_{02}$ on the frame J. The holding circuit comprises ground, make contact $v_{02}$, resistance $\rho_{02}$, break contact $ra_0$, coil winding of $V_{02}$ and battery. The holding circuit for the column electromagnets $V_{02}$ and $V_4$ extends by way of a break contact $c_{02}$ of the individual relay $C_{02}$ or by way of a break contact $ra_0$ of the auxiliary relay $RA_0$ of the marking relay $Qa_0$. Consequently, to release the connection $C_{02}$ and $RA_0$ must operate. This is achieved by means of the relays $R_1$ and RL as will be explained in Section II, 31.

II. 3 *Operation of the electromechanical part.*—Three cases will now be studied consecutively—connection, identification without disconnection, and identification with disconnection.

II. 31. Connection of a (free) originating or terminating subscriber's line to a trunk selected by route testing. The control signals are transmitted by the electronic part at three consecutive instants ($\phi_1$, $\phi_x$, then $\phi_2$ and finally $\phi_r$).

II. 311. *Marking of subscriber's line.*—The control signal $\phi_1$ controls the gates 45 and the transfer of the subscriber's code from subscribers' address register 23 to decoding relays NCA–NCF and NDA–NDF and control signal $\theta_x$ controls the relay X. Once the actuated decoding relays NCA–NCF and NDA–NDF have operated, each of them short-circuits its associated control amplifier by means of a contact which also serves to hold the respective relay (on a break contact of the release relay RL). For instance, relay NCA (FIG. 4) short-circuits its amplifier through contacts *nca* and $r_1$. As will be described hereinafter, in a subsequent phase (Section II. 313) the decoding relays are disconnected from their associated amplifiers by a break contact $r_2$ of a relay $R_2$, an action which stops the current in the control amplifiers which were delivering. Relay X energizes relay XB which in turn energizes relay XA. The control amplifier of relay X is then disconnected from the circuit thereof by make contact *xa* and remains thus disconnected until relay XA releases, this step of releasing must necessarily be subsequent to the releasing of relay X. Consequently, when the connection between the amplifier and its relay is restored by the releasing of relay XA, the excess voltages across the winding of relay X will have long disappeared and there is no chance of damage to the amplifier.

When relay XA is in operation (FIG. 5), the marking relays QP or QI, QG or QD and one of the relays Q*d* and one of the relays Q*u* ($Qd_4$ and $Qu_5$ in the example described) are energized in dependence upon the position taken up by the decoding relays N. If the combination resulting from the state of energization of relays N does not agree with the code used, there is no such energization of the marking relays Q (this matter will be taken up in Section IV. 1). The marking by the relays Q enables route testing to be performed (this matter will be dealt with in Section II. 4).

II. 312. *Trunk marking.*—When route testing (Section II. 4) has found an idle trunk accessible to the subscriber's line, the electronic part delivers a control signal $\phi_2$ which affects the decoding relays NAE–NAF and NBA–NBF in accordance with the code of the trunk. This leads to energization of a marking relay Q*a*, $Qa_0$ in the example described, and of a marking relay Q*b*, $Q_{b2}$ in the manner and example described and enables the appropriate row electromagnets (a total of four) to operate. Simultaneously, relay XB is short-circuited by the contact of the relay $Qa_0$ and therefore releases but with a delay giving enough time for correct positioning of the row selector bars and of their selector fingers. When relay XB has released the individual marking relay of trunk $C_{02}$ operated by way of break contact *xb,* make contact $qa_0$ and make contact $qb_2$. Since relay X is energized and relay Z is not, the circuit for energizing the column electromagnet $V_{02}$ of frame J, is established, with the result that the first connection point comes into operation and also that the column electromagnet of frame M*g* or M*d* is energized via the wire thus routed, as already seen. This circuit is held by a holding contact $v_{02}$ through a surge-limiting resistance $\rho_{02}$.

The electronic part then proceeds to vertify the connection, verification consisting, as will be seen hereinafter, in detecting continuity of the wire 3 by means of the subscribers' line scanner 22.

II. 313. *Connection of subscribers' lines and trunks. Route holding.*—When the verification described in Section I. 312 is performed, the electronic part delivers a control pulse $\phi_r$ which acts on the amplifier associated with the relay $R_1$. Such relay operates and, in so doing, short-circuits its amplifier and energizes the auxiliary relay $R_2$ (FIG. 4). By way of its break contacts $r_2$, relay $R_2$ disconnects all the amplifiers from their associated decoding relays N and also enables the release relay RL to operate, relay Z being inoperative. Release relay RL disconnects the circuit of relay $R_1$ from its amplifier and interrupts the holding circuits of all the decoding relays, but the excess voltage produced across their windings cannot affect the corresponding amplifiers since the same are disconnected by make contact $r_2$. Releasing of the decoding relays N leads to the releasing of the marking relays Q and of the individual relays $C_{ab}$, whereafter the row electromagnets which have been energized return to the normal state. Relay X also has its holding circuit interrupted by relay RL and therefore releases, to be followed, with delay, by relay XA. When all the decoding relays N and the relay XA have returned to rest, the holding of relay $R_1$ is cancelled at break contact *xa* and the same releases, followed by $R_2$, relay $R_1$ being the last to release. Only the column electromagnets $V_{ab}$ and $V_d$ which have been energized to maintain the route set up. The electronic part verifies the return of all the marking and control relays to the inoperative state by detecting that the terminal $\chi$ (FIG. 4) is no longer grounded.

II. 32 *Identification of a subscriber's line connected to a trunk without disconnection of the route.*—When the electronic part has received and registered the trunk code, it delivers control signals at two successive instants ($\phi_2$ and $\phi_z$, then $\phi_r$).

II. 321 *Trunk marking.*—The control signal $\phi_2$ controls the gates 46 and the transfer of the trunk code from trunk address register 26 to the decoding relays NAE–NAF and NBA–NBF and the control signal $\theta_z$ controls the relay Z. Some of the decoding relays and the relay Z operate and short-circuit their respective amplifiers. One marking relay Q*a*, $Qa_0$ in the example described, and one relay Q*b*, $Qb_2$ in the example described, operate and, since the relay XB is at rest, the marking relays C*ab*, $C_{02}$ in this particular case, operates immediately, such relay being associated with the trunk whose code has been received. Since relay Z is energized and since the electromagnets $V_{02}$ and $V_4$ are also energized (the connection is established), in all of the trunks the ground applied to wire 3 through the break contact *z* is removed since Z operates, but in the marked line equipment the ground is restored by the marking relay $C_{ab}$, namely by way of make contact $c_{02}$ of relay $C_{02}$. Consequently, there is only one wire 3 grounded in the whole concentrator, and the grounded wire 3 is the one corresponding to the required route. The line scanner can therefore make a sequential search to find the subscriber's line where the route terminates, and the electronic part will register the address of such subscriber.

II. 322 *Release.*—When this identification is completed, a second control signal $\phi_r$ delivered by the electronic part causes relay $R_1$ to operate through the agency of its associated amplifier. Relay $R_1$ energizes relay $R_2$, so that all the amplifiers are disconnected from the decoding relays N and the relay Z is also separated from its amplifier. Relay $R_1$ also energizes the release relay RL so that, as in the case considered in Section II. 313, all the energized relays can release without any excess voltages being applied to the associated amplifiers.

II. 33 *Identification of a subscriber's line connected to a marked trunk with disconnection of the route.*—When the electronic part has received and registered the code of the trunk to be disconnected, it delivers control signals at two successive instants $\phi_2$, $\phi_x$, $\phi_z$ on the one hand and $\phi_r$ on the other hand.

II. 331 *Marking of trunk.*—The first control signals affects the decoding relays (in analog to the process described for to the cases considered in Section II. 321) e.g. the decoding relays NAE, NAF and NBA–NBF (in accordance with the registered code), and also affects both relays X (control signal $\phi_x$) and Z (control signal $\phi_z$). When the relays X and Z have operated, they energize relay XA, but relay XB remains de-energized since its actuating circuit extends by way of a break contact of relay Z and a make contact of relay X, so that one relays $Qa_0$ and $Qb_2$, which are controlled in accordance with the code received by the decoding relays N, have operated, the individual marking relay $C_{02}$ for the trunk operates. Identification of the subscriber's line connected to the trunk is performed in exactly the same way as described with reference to the case in Section II. 321.

II. 332 *Marking for disconnection.*—On the completion of identification and when the subscriber's address has been registered by the electronic part, a second control signal $\phi_r$ energizes relay $R_1$. The same operates, short-circuits its control amplifier, energizes relay $R_2$—so that all the amplifiers are disconnected from the respective relays—and de-energizes relay X. Simultaneously, the auxiliary relay $RA_0$ of the marking relay $Qa_0$ operates, with the result that, by interruption at break contact $ra_0$ of holding wire 4, the column electromagnets $V_{02}$ and $V_4$ of the desired route are released, for holding is provided for as long as the individual marking relay $C_{02}$ or the relay $RA_0$ are normal, but when these two relays are in the operative state, all holding in respect of the marked route—and only in respect of the marked route—is cancelled and the chain disconnects.

After a time, depending upon the delay of its release (produced by a short-circuit winding) the relay XA releases, so that relay $RA_0$ releases and the release relay RL is operated. All the control relays used return to the normal state exactly as in the first case described. The electronic part verifies the return of all the relays to normal, including relay RL, by detecting that the terminal $\chi$ (FIG. 4) is not grounded.

II. 4 *Route testing.*—There is only one possible route between any particular subscriber's line and any particular trunk. Route availability is tested at the trunking level by a route tester 25 which can orientate itself in accordance with the addresses of all the trunks. The condition sought by the tester is the presence of a continuous ground voltage on a test terminal $t_{ab}$ associated with each trunk. This ground potential is given at the subscriber's line equipment level by a marking relay $Qd_0$ to $Qd_9$ energized in accordance with the code of the particular subscriber concerned, and such potential can be present at a test terminal at trunk level only if the single route connecting the two lines is available. Referring to what was previously said about multiples in the connection network, it will be apparent that a subscriber's line, since it is multipled at various places of clearly defined co-ordinates on each switch of a frame M, such line can be connected only by means of a definite column of each such switch. More particularly, in the case of the example now being described, if the particular subscriber's line concerned has a tens digit *d* and a units digit *u*, the rank of the column of switches of frame M (where the subscriber's line appears) which can connect such subscriber's line to a link is *d* or, in the case of multiple transposition, *d* for the switches of the top half of the frame and *u* for the switches of the bottom half. Such columns can therefore be denoted by means of contacts of the tens marking relays $Qd_0$ to $Qd_9$ or of the units marking relays $Qu_0$ and $Qu_9$.

Also, if a particular link is considered to be accessible to a subscriber's line (and is therefore connected to one of the columns just defined with its electromagnet in the normal state), it belongs to a switch of frame J and can be connected to any input thereof—i.e. to any trunk—through the agency of the corresponding column, provided only that the electromagnet of the last-mentioned column is in the normal state.

The route testing circuit 13 which applies a continuous ground potential to every test terminal corresponding to a trunk accessible to the marked subscriber's line comprises, as FIG. 3 shows, a series arrangement of the following contacts:

A make contact $qd_4$ of the tens marking relay $Qd$, in this case $Qd_4$.

A break contact $v_4$ of the column electromagnet of frame M of rank *d* (in this case $V_4$ for M*g* and $V_4$ for M*d*).

A make contact of the marking relay QG or QD which distinguishes the frame M*g* or M*d* to which the particular subscriber's line concerned is connected.

A break contact $v_{02}$ of the column electromagnet $v_{ab}$, in this case $V_{02}$, associated with the trunk.

As the foreging shows, when this circuit has been found to be continuous, the corresponding route is available and can be used to connect the subscriber. Consequently, from the time when the marking relays are in position, the trunk and the route to be connected can be selected by means of a test for continuous potential at test terminals $t_{ab}$. This is the job of the tester 25.

CHAPTER III.—ELECTRONIC PART

III. 1 *Registers.*—With regard to the registers, the considerations explained in U.S. Patent No. 2,979,571 previously referred to apply as a whole except for two differences. The first difference is that the registers of the system according to the invention are not formed by cascaded binary counting stages but are broken down into two registers—a main register and an auxiliary register. The purpose of the auxiliary register is to memorize the number previously marked while the contents of the main register are altered to give the next number, whereafter the auxiliary register again conforms to the contents of the main register.

Counter-progression is therefore effected in two phases. To start with, the two registers mark the same number *n*. During the first phase, the contents of the main register are so modified by a stepping-on control that such counter marks the number $(n+1)$. This alteration is made with allowance for the initial value *n* marked by the auxiliary register which does not alter. The alterations to be made are therefore fully defined when the number sequence pattern is fixed. During the second phase, the auxiliary register contents are made equal to the main register contents. This modification is fully defined since the main register does not alter.

The advantages of splitting up the counter registers in this way is that transient operations are obviated and that direct-coupled logical assemblies comprising merely gates and inverters can be used. Logical systems of this kind have been described in technical literature, for instance, under the name of "NOR-gates"; their advantage is that they can be embodied by means of a single logical circuit—association of an or-gate with an inverting amplifier. These practical advantages offset the apparent increase in the number of elements caused by splitting up the registers.

The second difference between the registers of this invention and the registers of U.S. Patent 2,979,571 is that the registers of this invention count in a "P amongst N" code—actually, the "three amongst six" code in the example described. The encoded values of the decimal digits in this code will be given with reference to FIG. 6, and their decoding will be described with reference to FIG. 7.

The subscriber-line address register 23 has a number of inputs and outputs so that on the input side, there is a stepping-on terminal 405 and a number of inputs from the analysis decoder 29; these last-named inputs are numbered 1–25 (terminals 13–24 are considered to be for the transmission of codes and terminals 14–25 are considered to be for the reception of the codes), and two inputs 311, 312 are supplied by the code receiver 31 and supply positive code pulses and negative code pulses respectively to the register. On the output side, there are a number of outputs extending to decorder 24, a number of outputs extending to the decoding relays for the subscribers' lines, and two outputs 301, 302 taken to the code transmitter 30.

Similarly, the trunk address register 26 has a number of inputs and outputs. On the input side, there is a stepping-on control terminal 406, a number of inputs from the analysis decorder 29 and numbered 1–13 (terminals 1–12 will be considered to be for transmission of codes and terminals 2–13 will be considered to be for reception of codes), and two inputs 311, 312, such inputs supplying the register with the positive and negative code pulses respectively. On the output side, a number of outputs extend to decoder 27, a number of outputs extend to the decoding relays for the trunks, and two outputs 301, 302 extend to the code transmitter 30.

The registers 23 and 26 are illustrated in FIGS. 8*a* and 8*b* which show the breakdown into a main register and an auxiliary register, the stepping-on system and the outputs connected to the decoders 24 and 27. The same registers are shown in FIGS. 9*a* and 9*b* which show the connections to the analysis decoder 29, the code receiver 31, the code transmitter 30 and the decoding and marking relay groups 12 of the subscribers' lines, and the similar marking relay group 14 for the trunks.

Register 23 comprises a main register 231 and an auxiliary register 232. The main register comprises twelve trigger stages CA–CF and DA–DF, and the auxiliary register comprises twelve trigger stages CA′–CF′ and DA′–DF′. The outputs to terminals 301, 302 of the code transmitter extend through the two gating circuits 2301–2312 and 2321–2332 which are associated in pairs; for instance, the circuits 2301, 2321 are associated with one another, circuit 2301 controlling the access of the top half of trigger stage CA to terminal 301, while the gating circuit 2321 controls access of the bottom half of trigger stage CA to terminal 302. These gating circuits are opened by a signal from terminal 401 of programmer 40.

The outputs to the decoding relays NCA–NCF and NDA–NDF of the decoding and marking relays 12 for the subscribers' lines extend by way of gating circuits 2341 to 2352, the opening of which is controlled by the signal $\phi$ applied to terminal 407.

The outputs to decoder 204 are by way of the gating circuits 2361–2372 and 2381–2392 which are associated in pairs; for instance, the circuit 2361 is associated with 2381, the circuit 2361 controlling the access of the top half of trigger stage CA to one of the lines of the matrix 24, while the circuit 2381 controls the access of the bottom half of trigger stage CA to another line of matrix 24, these two lines of matrix 24 being related to the digit stored in trigger stage CA. These gating circuits are opened by a signal from programmer terminal 409.

Inputs from terminals 311, 312 of the code receiver are taken by way of the two gating circuits 12301–12312 and 12321–12332 which are associated in pairs; for instance, the circuit 12301 is associated with the circuit 12321, the circuit 12301 controlling the access of the digit from terminal 311 to the top half of trigger stage CA, while the circuit 12321 controls the access of the digit from terminal 312 to the bottom half of trigger stage CA.

Register 26 comprises a main register 261 and an auxiliary register 262. The main register comprises twelve trigger stages ID, DX, $\overline{AE}$, AE, $\overline{AF}$, AF and BA–BF, and the auxiliary register comprises merely eight trigger stages AE′, AF′, BA′–BF′, for the trigger stages ID, DX, $\overline{AE}$, $\overline{AF}$ have special jobs to perform and do not change as the register alters. The outputs to terminals 301, 302 of the code transmitter are taken by way of the two gating circuits 2601–2612 and 2621–2632 which are associated in pairs; for instance, the circuit 2606 is associated with the circuit 2626, the circuit 2606 controlling the access of the top half of trigger stage AF to terminal 301, while the circuit 2626 controls access of the bottom half of trigger stage AF to terminal 302. These gating circuits are opened by a signal from programmer terminal 401.

The outputs to the decoding relays NAE–NAF and NBA–NBF of the trunk decoding and marking relays 14 are taken by way of gating circuits 2645 to 2652, the opening of which is controlled by the signal $\phi_2$ applied to terminal 408. The outputs to decoder 27 are by way of the two gating circuits 2665–2672 and 2685–2692 which are associated in pairs; for instance, the circuit 2666 is associated with the circuit 2686, the circuit 2666 controlling access of the top half of trigger stage AF to one of the lines of matrix 27, while the circuit 2686 controls the access of the bottom half of trigger stage AF to a different line of matrix 27, these two lines of the matrix being related to the digit stored in trigger stage AF. These gating circuits are opened by a signal from programmer terminal 409.

The inputs from code receiver terminals 311, 312 are by way of the two gating circuits 12601–12612 and 12621–12632 which are associated in pairs; for instance, the circuit 12601 is associated with the circuit 12621, the circuit 12601 controlling the access of the digit from the terminal 311 to the top half of the trigger stage ID, while the circuit 12621 controls the access of the digit from terminal 312 to the bottom half of trigger stage ID.

The connection between the main register and auxiliary register of the registers 23 and 26 will be described, in the case of the register 23, in Chapter IV.

III. 2 *Scanner.*—The scanner 22, 24, 43 shown in FIG. 1 has for its purpose to discover the state of the subscribers' lines. It is of conventional design so far as detecting whether a subscriber's line is open or closed, but a feature of the invention resides in the particulars which the scanner can provide on the state of the line relatively to the concentrator and in the means used to discover such particulars. According to this invention, the same means (basically, the third wire 3 in parallel with the speech circuit and switched simultaneously with the speech circuit wires through the concentrator connection network) are used to indicate:

The connection or non-connection of a subscriber's line to a trunk through the crossbar switches.

The state of a subscriber's line connected to a predetermined trunk in order to identify the subscriber's line from the trunk.

The scanner according to the invention therefore performs a novel job as compared with the prior art and identification system—i.e. it seeks a subscriber's line to be identified after marking on a particular trunk.

In short, the functions of the scanner are as follows:

Finding an originating subscriber's line—i.e. in the non-connected and closed-loop state (this information forms what will be referred to hereinafter as the $\alpha$-response of the scanner).

Determining the state of connection or non-connection of a subscriber's line designated by its address, a job which is the conventional job of test switching to find out about the availability of a called subscriber (this information will hereinafter be referred to as the $\beta$-response of the scanner).

Seeking a subscriber's line connected to a trunk designated during an identification process, mainly distinguished by a switching of the third wire at the level of the trunking equipment, so that the $\beta$-response information of the scanner is used during this process.

The information supplied by the scanner will be referred to as follows:

$\alpha$.—For the case in which, during finding calling lines, the subscriber's line denoted by the address contained in the register 23 is in the non-connected and closed-loop state.

$\bar{\alpha}$.—For the case where during finding calling lines the above condition is not found.

$\beta$.—For the case where, during the determination of the state of a subscriber's line denoted by the contents of register 23, such line is in the non-connected state, during the process of identifying a subscriber's line connected to a trunk denoted by the address contained in register 26 and marked by energization of its individual marking relay $C_{ab}$; such subscriber's line, denoted by the address contained in register 23, is not connected to such trunk.

$\bar{\beta}$.—For the case in which either of the two conditions just set forth is absent—i.e. in the case of testing a called subscriber's line, if such line is busy, and in the case of finding a subscriber's line to be identified, if such line is connected to the marked trunk.

Like the tester, the scanner takes the form of a decoder which is diagrammatically illustrated in FIG. 10 and the inputs of which are connected to the outputs of the trigger stages CA to CF and DA to DF of the subscribers' register 23 through gating circuits 2361–2372 and 2381–2392. The scanner decoder has two matrices—a first order "twenties" decoder connected to trigger stages CA–CF and a zero "twenties" decoder connected to trigger stages DA–DF since in six digits binary numbers, there are only twenty numbers which pertains to the "three amongst six" code.

The twenty outputs of the first matrix and the twenty outputs of the second matrix are combined in a matrix (not shown) having four hundred points each allotted to a subscriber's line determined by the address supplied by register 23. One of the four hundred scan points is illustrated in the rectangle 22 shown in FIG. 3 beside the subscriber's line equipment 21 and comprises an and-gate circuit having diodes 221 and 222 connected to the first order twenties outputs *d* and to the zero order twenties outputs *u* of the matrices of the first stage of the decoder 24 and also to the third wire 3 which acts as the third input of a three-input and-gate.

The scan point shown has two outputs, one connected through diode 431 to the joint output $\beta$ of the scanner response circuit and the other connected through diode 432 to the joint output $\alpha$ of the last-mentioned circuit. Output $\alpha$ is reached via the detection system of the line loop mainly formed by a diode 211 so connected that, when the loop is closed, diode 211 is conductive, becoming non-conductive when the loop is open.

Such a circuit is known in the prior art, for instance, from a paper by A. Feiner and L. F. Goeller entitled, "A High-Speed Line Scanner for Use in an Electronic Switching System," which appeared in the American Journal, "The Bell System Technical Journal," November 1958, pages 1381 to 1403 (see particularly FIG. 12, page 1395).

III. 3 *Tester.*—The tester is very similar to the scanner, except that the tester decoder, shown in FIG. 11, has only eightly cross points instead of four hundred; of these eighty points, only sixty are operative because there are only sixty trunks. A testing point, as denoted by rectangle 25 in FIG. 3, is very similar to a scanning point; there is only a single exit $\gamma$, and ground testing is performed not on the third wires 3 but on the testing points $t_{ab}$.

CHAPTER IV.—CODE

IV. A *Code used, decoding and error detection.*—In the two-stage concentrator according to this invention, the items of information to be transmitted—i.e. trunk or subscribers' addresses—are in the form of a numeration to base 20, for in such a numeration, for instance, a subscriber's line can be defined by two digits, since there are four hundred such lines. It is therefore very advantageous to use a "three amongst six" type code, both for data transmission between the concentrator and the central office and also for registering addresses and for decoding within the concentrator. In a code of this nature, every number is defined by a group of six characters hereinafter referred to as A, B, C, D, E, F, and only a combination in which three of these characters are equal to one, the other three being zero, is considered as belonging to the code; any other combination must not normally appear either as a register address or as transmitted or received data and must be considered as an error. This property readily helps to show whether or not a combination is correct.

Of the sixty-four possible combinations of six binary digits, only twenty belong to the error-detecting code of the "three amongst six" kind considered here, and this property is particularly well suited to representation of the numbers in a numeration to base 20. To completely define a numeration code, a definition must be given not only of the nature of the binary character combinations which belong to the code but also of their sequential order—in other words, the correspondence between each whole number (in this case the twenty numbers from 00 to 19) and the code combination representing the whole number.

Figure 6:
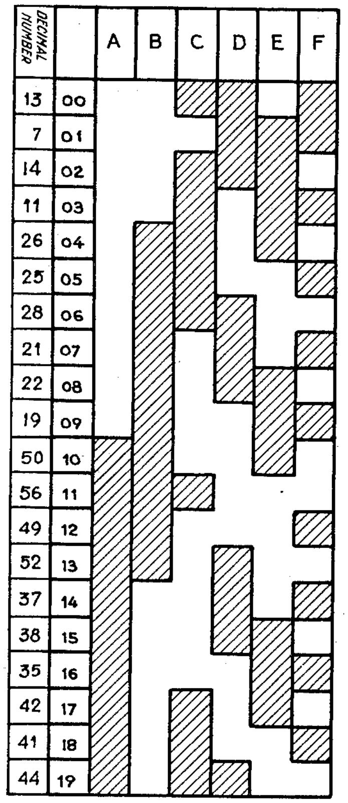
FIG. 6 illustrates the "three amongst six" binary code used in the concentrator and the equivalent decimal figures placed in the counting order used.

Of the many possible ways of providing a sequential order having twenty combinations of six binary digits in "three amongst six" code, the one selected is very useful for the particular purposes required and is diagrammatically illustrated in FIGS. 6 and 7. In FIG. 6, a hatched square corresponds to a digit of value one; in the code selected, each of the twenty combinations illustrated comprises three hatched squares and three blank squares.

The code illustrated in FIG. 7 has been selected for a number of reasons which will now be explained.

As previously stated, during certain phases of the operation the registers 23 and 26 must supply *seriatim* subscribers' addresses or trunk addresses in a predetermined order, for instance, in ascending numerical order. In other words, such registers must be adapted to be arranged readily as counters so that a stepping-on order shifts the register contents from the existing value to the immediately consecutive value. The logical circuits used to provide this shifting to the consecutive combination are, of course, simpler in proportion as the sequence of combinations is more carefully chosen. In the example described here, as has been shown, each of the two registers 23 and 26 actually comprises two elements—a main register and an auxiliary register, the latter memorizing the previously registered combination while the main register is shifted. With this arrangement, a direct-coupled logical system can be used, the operation of which is completely independent of the duration of the control pulses, contrary to what occurs in conventional binary counting systems where the previous combination is memorized by means of delay lines or the like.

In the conventional systems where no second auxiliary register is provided, the previous combination must be sampled on the register as the register contents are actually altering, and this is an operation which can be performed reliably only within time limits and by introducing a delay between sampling of the previous combination and the shift order.

In the system provided by the invention, the auxiliary register contents are at given times made identical to the main register contents and are used at a later time, corresponding to the shift order, to define by means of simple logical circuits which are the trigger stages of the main register whose position requires altering.

Shifting is effected in two phases. During the first phase, the auxiliary register is harmonized with the main register, and the same is shifted during the second phase. Consequently, the main register contents do not alter during the first phase and can be used to define various logical functions or can be decoded to mark an address, but during the second phase the auxiliary register contents do not change and can be used for other purposes than their main purpose which is to ensure correct shifting of the main register.

Operation of the registers will be described with reference to FIGS. 8*a* and 8*b* so far as stepwise advance of the six trigger stages CA, CB, CC, CD, CE, CF of the main register in accordance with the "three amongst six" code of FIG. 6 is concerned, in association with the similar fraction of the auxiliary register represented by the six trigger stages CA', CB', CC', CD', CE', CF'.

Of course, the register 23 which marks two digits in a numeration to base 20 actually takes the form, as already stated, of two systems of six pairs of trigger stages—the CA–CF and CA'–CF' system, which is being studied, and the DA–DF and DA'–DF' system.

In Boolian notation the conditions which cause the main register trigger stages to operate when a shift order reaches terminal 405 are as follows (in the statement of the conditions, the trigger stage CA has the reference A and the trigger stage CA' has the reference A' and so on):

Operation of trigger stage $A=\overline{C}'.\overline{D}'$
Operation of trigger stage $B=\overline{A}'.\overline{D}'$
Operation of trigger stage $C=E'(\overline{B}.F'+B'.A')$
Operation of trigger stage $D=\overline{E}'(F'+\overline{C}')$
Operation of trigger stage $E=D'.F'$
Operation of trigger stage $F=\overline{F}'(C'+D')$ Similarly, the conditions during which these trigger stages are returned to normal are as follows:

Return to normal of trigger stage $A=C'.D'$
Return to normal of trigger stage $B=A'.D'$
Return to normal of trigger stage $C=\overline{E}'(B'.\overline{F}'+\overline{B}'.\overline{A}')$
Return to normal of trigger stage $D=E'(\overline{F}'+C')$
Return to normal of trigger stage $E=\overline{D}'.\overline{F}'$
Return to normal of trigger stage $F=F'(\overline{C}'+\overline{D}')$ As the table given in FIG. 6 makes readily apparent, the presence of these conditions means that, when the contents of the two registers are each the same combination of the "three amongst six" code, the main register contents shift to the next combination. For instance, if the starting combination is "03" (trigger stages CC, CE, CF, CC', CE', CF' in operation), the shift to combination "04" (trigger stages CB, CC, CE), requiring operation of trigger stage CB and return to normal of trigger stage CF, is produced by the two conditions ($\overline{A}'.\overline{D}'$) for operation of CB and F' ($\overline{C}'+\overline{D}'$) for the resetting of CF to normal. As the table also shows, the progression is cyclic, for if the start is made from the combination "19," the combination "00" is reached.

A very interesting property of the logical circuit in FIG. 6, such property being symbolized by the logical equations just given, is what can be called the "stability" of the circuit, in the sense that, starting from any combination whatever of the positions of the trigger stages CA–CF, even if such position does not form part of the "three amongst six" code, there is always at the end a return, after a limited number of shift orders (a number varying with the combination initially selected) to a combination forming part of the "three amongst six" code, whereafter shifting becomes cyclic through the twenty code combinations. A particular advantage of this feature is that there is no need to worry about zero resetting of the registers when the system is started, for normal cyclic operation can be started just by giving an adequate number of shift orders interspersed, of course, with orders for harmonizing the auxiliary register with the main register which are systematic in all the first phases.

Another useful feature of the code shown in FIG. 6 is the facility with which it can be decoded, including extraction of the tens decimal digit materialized by the position just of the trigger stage CA.

Indeed, as the table in FIG. 6 shows, two combinations having the same units decimal figure, for instance, the combination "01" (trigger stages CD, CE, CF in operation) and the combination "11" (trigger stages CA, CB, CC in operation) are exactly the reverse of one another and are deduced by changing over the position of all the trigger stages. Consequently, if the units decimal digit and the tens decimal digit are required to be decoded separately, only the positions of three of the six trigger stages need be considered; for instance, the units decimal digit 1 corresponds either to the trigger stages CA, CB, CC being in operation or to the trigger stages CA, CB, CC being in the inoperative state.

In the case of the concentrator according to the invention, decoding is performed by means of the contacts of the decoding relays N which are positioned directly in accordance with the contents of the registers 23 and 26. Decoding is performed as shown in the general diagram given in FIG. 7 in which the decoding relays N are denoted merely by their final letters, A, B, C, D, E, F to make their relation with the table in FIG. 6 clearer.

The decoding and marking circuits 12 and 14 are of the kind shown in FIG. 7 so far as marking is concerned. They set up a connection between a terminal 121 marked by a marking potential, such as ground potential, and two output terminals—a tens terminal, 00 or 10, and a units terminal 0, 1, 2, 3, 4, 5, 6, 7, 8, 9. This connection is set up only if the "three amongst six" code is respected, for the decoder in question is formed by serially connecting the contacts of the actual decoding relays (right hand part of FIG. 7) and of a known parallelogram-like circuit, a connection being provided between the grounded terminal 121 and one of its two output terminals (which are also the tens terminals) only if any three of the six relays—and only three—are in the operative condition. Consequently, if the combination transmitted from the register to the decoding relays N does not conform with the code, the relay type decoder shown in FIG. 7 does not provide any connection, and so the marking relays Q (FIG. 5) associated with the incorrect group are not energized and cannot cause any incorrect marking or incorrect connection.

The decoding circuit illustrated in FIG. 7 serves in FIG. 5 to control:

The marking relays QI–QP (digit $c_1$ of subscriber's code) and the marking relays $Qu_0$ to $Qu_9$ (digit $u$ of the subscriber's code) from the decoding relays NCA–NCF associated with the trigger stages CA–CF of the register 23.

The marking relays QG–QD (digit $c_2$ of the subscriber's code) and the marking relays $Qd_0$ to $Qd_9$ (digit $d$ of the subscriber's code) from the decoding relays NDA–NDF associated with the trigger stages DA–DF of the register 23.

The marking relays $Qb_0$ to $Qb_9$ (digit $b$ of the trunk code) and the marking relays $Qa_0$ to $Qa_5$ (digit $a$ of the trunk code) from the decoding relays NAE–NAF and NBA–NBF associated with the trigger stages AE–AF and BA–BF of the register 26.

The correlation between FIG. 5 and FIG. 7 is clear. The relay type decoder output terminals are all marked 0 to 9 for the units and 00 to 10 for tens. The break and make contacts marked A correspond to contacts

*nca* on the left-hand side of FIG. 5, *nda* in the central part, and *nba* in the right-hand part of FIG. 5.

IV. 2 *Formation of codes for reception.*—The code received by the concentrator comprises a start pulse and twelve code pulses, the start pulse being positive in the case of connection of a calling or a called subscriber, and being negative in the case of an identification, whether such identification is made with disconnection or without disconnection.

In the case of a connection—i.e. of a positive start pulse—each of the binary digits correspond to one of the twelve trigger stages CA–CF and DA–DF of the subscribers' register 23. In the case of identification—i.e. of the start pulse being negative—the last six binary digits correspond each to one of the six trigger stages BA–BF of the trunk register 26. On the other hand, the first six binary digits are broken down into three groups each consisting of two binary digits. In each such group the secondary binary digit is the complement of the first binary digit in the sense of Boolian algebra. Since three of such digits always equal zero, the code is definitely of the "three amongst six" kind. The first group of two binary digits distinguishes the kind of operation to be performed—i.e. identification with disconnection or identification without disconnection. The second two-digit group gives a position of a trigger stage $\overline{AE}$ complementary to the trigger stage AE and the position of the latter. The third two-digit group gives the position of a trigger stage $\overline{AF}$ which is complementary to the trigger stage AF, and also gives the position of the latter.

When the analysis register 28 is in position 13, the trigger stage BF is operated only in the case of identification—i.e. negative start pulse, for in the case of connection (positive start pulse) position 13 is a position corresponding to reception of the start pulse, a pulse which is not received in the analysis register. To allow for this selective feature of operation, the terminal 13 is split into two terminals: one terminal 13 (FIG. 9*a*) is connected to gating circuits 12612 and 12632 and receives a pulse only if the received code relates to an identification, while the other terminal has the reference 13 *bis* (FIG. 9*b*), is connected to gating circuits 2301 and 2321, and receives a pulse in the case of transmission of codes.

The following table shows the correlation between analysis decoder positions and the address register trigger stages $\overline{AE}$, AE, $\overline{AF}$ AF, BA–BF, CA–CF, DA–DF and the nature-of-operation trigger stages (trigger stage ID marking the identification, and trigger stage DX marking disconnection).

POSITIONS OF ANALYSIS REGISTER 28 DURING RECEPTION OF CODES

| Connection | | | Identification with or without Disconnection | | |
|---|---|---|---|---|---|
| Register position | Pulse No. | Recorded in— | Register position | Pulse No. | Recorded in— |
| 13 | Start+ | Programmer. | 1 | Start− | Programmer. |
| 14 | 1st | CA. | 2 | 1st | ID. |
| 15 | 2nd | CB. | 3 | 2nd | DX. |
| 16 | 3rd | CC. | 4 | 3rd | $\overline{AE}$. |
| 17 | 4th | CD. | 5 | 4th | AE. |
| 18 | 5th | CE. | 6 | 5th | $\overline{AF}$. |
| 19 | 6th | CF. | 7 | 6th | AF. |
| 20 | 7th | DA. | 8 | 7th | BA. |
| 21 | 8th | DB. | 9 | 8th | BB. |
| 22 | 9th | DC. | 10 | 9th | BC. |
| 23 | 10th | DD. | 11 | 10th | BD. |
| 24 | 11th | DE. | 12 | 11th | BE. |
| 25 | 12th | DF. | 13 | 12th | BF. |

IV. 3 *Formation of codes in the case of transmission.*—The code transmitted by the concentrator consists of two start pulses, the first of which is negative and the second of which is positive—i.e. forming the group 0–1 and twenty-two code pulses. The following table shows the correlation between analysis decoder positions and the address register trigger stages $\overline{AE}$, AE, $\overline{AF}$, AF, BA–BF, CA–CF, DA–DF.

POSITIONS OF ANALYSIS REGISTER 28 DURING TRANSMISSION OF CODES

| Register position | Pulse No. | Transmitted by— | Register position | Pulse No. | Transmitted by— |
|---|---|---|---|---|---|
| 1 | Start− | ID. | 13 | 11 | CA. |
| 2 | Start+ | DX. | 14 | 12 | CB. |
| 3 | 1 | $\overline{AE}$. | 15 | 13 | CC. |
| 4 | 2 | AE. | 16 | 14 | CD. |
| 5 | 3 | $\overline{AF}$. | 17 | 15 | CE. |
| 6 | 4 | AF. | 18 | 16 | CF. |
| 7 | 5 | BA. | 19 | 17 | DA. |
| 8 | 6 | BB. | 20 | 18 | DB. |
| 9 | 7 | BC. | 21 | 19 | DC. |
| 10 | 8 | BD. | 22 | 20 | DD. |
| 11 | 9 | BE. | 23 | 21 | DE. |
| 12 | 10 | BF. | 24 | 22 | DF. |

CHAPTER V.—OPERATION OF THE COMPLETE ELECTRONIC AND ELECTROMECHANICAL EQUIPMENT

V. 1 *Originating call.*—The concentrator is initially in the normal state. The analysis decoder is in position 0. In this state the programmer 40 transmits through lead 48 stepping pulses to terminal 405 of the subscribers' register 23. When a subscriber off-hooks, the scanner response circuit 43 receives a signal $\alpha$ which is transmitted to the programmer. The same transmits a control signal $\theta_X$ to relay X (FIG. 4). As already seen in Chapter II, relays X, XB and XA pick up in that order. Programmer 40 then transmits to terminal 407 of subscribers' register 23 a control signal $\phi_1$, the same being supplied to the subscribers' coding and marking gate 45 and the decoding relays NCA–NCF and NDA–NDF take up positions corresponding to those of the corresponding trigger stages CA–CF and DA–DF. The programmer 40 then transmits through lead 49 stepping pulses to terminal 406 of trunk register 26. When an idle trunk is found which can be connected to the originating line, such trunk being distinguished, as stated in Chapter III hereof, by a signal $\bar{\tau}$ at the output of the tester response circuit 44, the stepping-on of register 26 is interrupted and the programmer 40 transmits to the trunk coding and marking gate 46 a control signal $\phi_2$ and the decoding relays NAE–NAF, NBA–NBF take up positions corresponding to those of the corresponding trigger stages AE, AF, BA–BF. The marking relays $Qa_0$ to $Qa_5$ and $Qb_0$ to $Qb_9$ which correspond to the decoding relays which have operated are in turn energized.

Since the marking relays QP, QI, QG, QD, $Qd_0$ to $Qd_9$, $Qu_0$ to $Qu_9$ corresponding to the energized subscribers' line decoding relays operated when the control signal $\phi_1$ was transmitted, the row electromagnets of the crossbar switch operate then, after the delay due to the delayed release of relay XB, the individual trunk marking relay $C_{ab}$ operates so that the column electromagnets operate. The programmer 40 then transmits to the central office via lead 50 and transmitter 30 a pulse to warn it of the connection of an originating subscriber. This pulse, which is neither a start pulse nor a code pulse, prevents any seizure of trunks by the central office until the concentrator, having made some vertifications, proceeds to transmit the codes.

The programmer also tests terminal *c* (FIG. 4) to check that the individual marking relay of the seized trunk has operated, and if terminal *c* is properly grounded, the programmer 40 tests output point $\beta$ of the scanner response circuit 43; the response should be $\overline{\beta}$. Upon receiving the response signal $\overline{\beta}$, the programmer transmits the control signal $\phi_r$. The release relays $R_1$, $R_2$, $R_L$ operate and the row electromagnets release as described in Chapter II. Releasing of the row electromagnets is indicated by the disappearance of ground potential from terminal $\chi$ (FIG. 4). When this signal is received by the programmer, the same orders transmission of the code. To this end, it transmits to the analysis register 28 stepping-on pulses via connection 51. The analysis decoder designates its terminals 1–24 consecutively, and programmer 40 marks terminal 401, with the results that the gating circuits 2601–2612 and 2621–2632 of the trunk register and the gating circuits 2301–2312 and 2321–2332 of the subscribers' register are opened sequentially. The binary digits stored in trigger stages $\overline{AE}$, AE, $\overline{AF}$, AF, BA–BF, CA–CF, DA–DF are transmitted to the two terminals 301, 302 of the code transmitter 30.

It will also be apparent that as they pass over its positions 1 and 2, the decoders ID and DX being in the inoperative state, the digits 1 and 0 are transmitted by the trunk register 26. In position 24 of the analysis decoder, a signal is transmitted by analysis register 28 to programmer 40 via lead 52 to stop transmission of code pulses. Programmer 40 restarts to transmit stepping-on pulses to the subscribers' register 23 via lead 48.

V. 2 *Terminating call.*—The concentrator is initially in the inoperative state. The analysis decoder is in the zero position. In this state the programmer 40 transmits via lead 48 stepping-on pulses to terminal 405 of the subscribers' register 23. The programmer 40 becomes operative immediately upon the reception of a positive start pulse via connection 47, changes analysis register 28 over into poistion 13 which is the initial position for receiving the code of a subscrber's line, whereafter, by way of connection 51, programmer 40 steps on the analysis register 28 in accordance with the code pulses received from code receiver 31 via lead 47. Simultaneously, the subscriber's register receives via terminals 311, 312 code pulses from the code receiver, and also receives distribution pulses from analysis decoder 22. The code of the terminating subscriber is therefore entered into trigger stages CA–CF and DA–DF of the subscribers' register 23. When the analysis decoder reaches position 25, a pulse is transmitted by such decoder to the programmer 40 through lead 53 to mark the termination of the code pulse reception period.

The programmer then transmits a test pulse to scanner 22 which is in the position corresponding to the terminating subscriber, and the scanner response circuit 43 receives either the condition $\beta$ or the condition $\overline{\beta}$. If the terminating subscriber is free, the $\beta$ condition is received and programmer 40 transmits via its terminal 402 a control signal $\phi_x$ to relay X (FIG. 4). The remainder of the operatioins are as for connection of an originating subscriber (see Chapter V, Section 1).

V. 3 *Identification of a connected subscriber with disconnection.*—Upon reception via lead 47 of a negative start pulse, the programmer 40 steps on the analysis register from position 1 in accordance with code pulses received via lead 47. Simultaneously, the trunk register receives via terminals 311, 312 the code pulses from the code receiver 31 and also receives distribution pulses from analysis decoder 29. The instruction signals for identification (digit 1) and disconnecttion (digit 1) are entered into trigger stages ID and DX, and the code of the trunk about which information is required as to the subscriber to which the trunk is connected is entered in trigger stages AE, AF, BA–BF of the trunk register 26. When the analysis decoder reaches position 13, a pulse is transmitted by such decoder to the programmer 40 through lead 53 to mark the end of the code pulse reception period. The programmer then transmits control signals $\phi_2$, $\phi_x$, $\phi_z$, the transmission of signal $\phi_x$ being caused by the trigger stage DX operating. The result is that the trunk code is transferred to the decoding relays and then to the marking relays, and the relays X and Z operate. Only one of the marking relays $Qa_0$ to $Qa_5$ and $Qb_0$ to $Qb_9$, and therefore the individual marking relay for the trunk whose code has been received (relay $C_{ab}$), operates. Since the trunk is assumed to be connected, the column electromagnets $V_{ab}$ and $V_d$ are in operation and the third wire 3 is at ground potential. The programmer starts up the scanner 22, stopping when the scanner response circuit 43 receives the response signal $\overline{\beta}$. The programmer then transmits control signal $\phi_r$ which, as already described, causes disconnection. The programmer verifies disconnection by testing terminal $\chi$ which is at ground potential for as long as the disconnection is inoperative. The programmer then starts to transmit the codes as described in Section 1 of this Chapter V.

V. 4 *Identification of a connected subscriber without disconnection.*—There are two differences from the case outlined in Section 3 of Chapter V. In code reception the second digit is a 0 and the trigger stage DX does not operate. The programmer 40 does not transmit the pulse $\phi_x$. Also, at the time when the programmer transmits the release control signal $\phi_r$ the auxiliary release relay $RA_a$ does not operate for it is controlled through a make contact *xa* of the auxiliary relay XA of the relay X, and the latter has not operated due to the absence of the control signal $\theta_x$. Consequently, the fourth wire 4 is not interrupted at $ra_a$ and the column electromagnets do not release.

The operations of connecting an originating or terminating subscriber and of identification with or without disconnection are illustrated in parts 1–4 of FIG. 12. The horizontal lines opposite the reference of a relay or of an electromagnet denote the time during which such relay or electromagnet is in operation. Hatched parts denote delays in releasing.

The programmer 40 has not been described in detail since it is a quite simple programmer adapted to produce instruction pulses when one among a set of possibly occurring conditions simultaneously occur. Programming methods are for example disclosed in "Arithmetic Operations in Digital Computers," by R. K. Richards, pages 354–384. For instance, the programmer is required to produce the control signal $\phi_x$ in the following cases:

Subscriber's originating call and presence of signal $\alpha$.

Subscriber's terminating call and presence of a positive start pulse in position 13 of the analysis register 28 (see Chapter IV. 2) and signal $\beta$.

Identification with disconnection, presence of a negative start pulse in position 13 of the analysis register 28 (see Chapter IV. 2) and of second positive code (DX) pulse.

The corresponding part of the programmer is diagrammatically illustrated in FIG. 13 where a trigged stage 61 receives a signal $\alpha$, and two trigger stages 62, 63 respectively receive the signal $\beta$ and the positive start pulse, while two trigger stages 64 and 65 respectively receive the negative start pulse and the second code pulse in the case of the start pulse being negative. 66 and 67 denote and-gates, 68 denotes an or-gate and 69 denotes an and-gate which also receives a timing pulse from the time base included in the programmer. The output of gating circuit 69 is the programmer terminal 402 at which the control signal $\phi_x$ appears.

What we claim is:

1. A crossbar switch electronically controlled concentrator for connecting a number of subscribers' lines to a central telephone station via trunks which are fewer in number than the number of subscribers' lines served by said concentrator comprising in combination a code transmitter and a code receiver which are respectively adapted for transmitting to said central station and receiving from said central station subscribers' line and trunk addresses formed by a number of binary digits expressed in an error detecting code, and electronic subscribers' line address register and an electronic trunk address register both formed by a number of binary storage circuits, address transfer means between said registers and said code transmitter and receiver, a set of first relays corresponding one by one to said storage circuits, address transfer means between said subscribers' line address and trunk address registers and said first relays, a two-stage crossbar switching network having row select electromagnets and columns hold electromagnets, said subscribers' lines and trunks being connected through said network by first actuating in said first stage a row select electromagnet and a column hold electromagnet corresponding to the address of the subscriber's line to be connected to a trunk and secondly actuating in said second stage a row select electromagnet and a column hold electromagnet corresponding to the address of the trunk to be connected with a subscriber's line, a set of second control relays controlling said select and hold electromagnets, means for checking the subscriber's line address and the trunk address transferred in said first relays according to the error detecting code, and means controlled by said checking means for selectively energizing the second control relays corresponding to a subscriber's line and to a trunk according to the respective addresses thereof stored in said first relays.

2. A crossbar switch electronically controlled concentrator for connecting a number of subscribers' lines to a central telephone station via trunks which are fewer in number than the number of subscribers' lines served by said concentrator comprising, in combination, a code transmitter and a code receiver which are respectively adapted for transmitting to said central station and receiving from said central station subscribers' line and trunk addresses formed by a number of binary digits having an equal number N of zero digits and of one digits, an electronic subscribers' line address register and an electronic trunk address register both formed by a number of binary storage circuits, address transfer means between said registers and said code transmitter and receiver, a set of first relays corresponding one by one to said storage circuits, address transfer means between said registers and said first relays, a two-stage crossbar switching network having row select electromagnets and column hold electromagnets, said subscribers' lines and trunks being connected through said network by first actuating in said first stage a row select electromagnet and a column hold electromagnet corresponding to the address of the subscriber's line to be connected with a trunk and secondly actuating in said second stage a row select electromagnet and a column hold electromagnet corresponding to the address of the trunk to be connected with a subscriber's line, a set of second control relays controlling said select and hold electromagnets, means for counting the number of zeros and the number of ones in each address and checking the equality of said numbers, and means for selectively energizing the second control relays corresponding to a subscriber's line and to a trunk according to the respective addresses thereof stored in said first relays.

3. An independent connection code bases controlled concentrator for connecting a number of subscribers lines to a central telephone station via a lower number of trunks comprising, in combination, a code transmitter and a code receiver adapted for transmitting to said central station and receiving from said central station respectively subscribers' line and trunk addresses formed by a number of binary digits, an electronic subscribers' line address register and an electronic trunk address register both formed by a number of binary storage circuits, binary digit transfer means between said registers and said code transmitter and receiver, a set of decoding relays corresponding one by one to said storage circuits, binary digit amplifier means and binary digit transfer means inserted between said registers and said decoding relays, means for separating said decoding relays from said amplifier means when a connection between a subscriber's line and a trunk is established, a set of marking relays, each of said marking relays having a predetermined binary code which is a part of the code of a subscriber's line and of a trunk line to correlate a given subscriber's line address and a given trunk address to one of said marking relays, each of said marking relay being fed through make contacts of decoding relays which represent the binary digit one and through break contacts of decoding relays which represent the binary digit zero in the binary code of the marking relay, a two-stage crossbar switching network having row electromagnets and column electromagnets, said subscribers' lines and trunks being connected through said network by actuating row electromagnets and column electromagnets depending upon the respective address of the line and trunk to be connected, means for energizing the row and column electromagnets relative to the connection between a given subscriber's line and a given trunk through contacts of the marking relays corresponding to the addresses of the same, and means for checking the connection said checking means controlling said separating means.

4. An independent connection code basis controlled concentrator for connecting a number of subscribers' lines to a central telephone station via a lower number of trunks, said subscribers' lines being defined by binary addresses corresponding to a units decimal number, a tens decimal number, and a first and second binary digits, said trunks being defined by binary addresses corresponding to a units decimal number and to a tens decimal number, comprising, in combination, a subscribers' line stage and trunk stage crossbar switching network having row electromagnets and column electromagnets, said subscribers' lines and trunks being connected to said trunk stage crossbar switching network, the connection between a given address subscribers' line and a given address trunk requiring actutaion, in the subscribers' line of said network stage, the last two rows of said line stage crossbar network consisting of a double row of electromagnets, each of said rows serving to increase the output of the switching network and being fed by a signal defined by the first binary digit of the subscriber's line address said double row including a row electromagnet defined by the units number of said address and a column electromagnet defined by the tens number of said address and, in the last two rows of said trunk stage crossbar switching network a double row of electromagnets which defines the second binary digit of the subscriber's line address and which includes a row electromagnet which defines the units number of said address and a column electromagnet which defines the units and tens numbers of the trunk address, a code transmitter and a code receiver adapted for transmitting to said central station and receiving from said central station respectively the said subscribers' line and trunk addresses, an electronic subscribers' line address register and an electronic trunk address register both formed by a number of binary storage circuits, binary digit transfer means between said registers and said code transmitter and receiver, a set of decoding relays corresponding one by one to said storage circuits, binary digit transfer means between said registers and said decoding relays, a set of marking relays corresponding one by one to the switching network electromagnets, each having a predetermined binary code which is a part of the code of a subscriber's line and of a trunk whereby to a given subscriber's line address correspond two doubler marking relays, a units marking relay and a tens marking relay and to a given trunk address correspond a units marking relay and a tens marking relay, each of said marking relays being fed through make contacts of decoding relays which represent the binary digit one and break contacts of decoding relays which represent the binary digit zero in the binary code of the marking relay, and means for energizing the crossbar switching network electromagnets by the corresponding marking relay.

References Cited by the Examiner

UNITED STATES PATENTS

| | | | |
|---|---|---|---|
| 2,850,576 | 9/58 | Krum et al. | 179—18 |
| 2,979,571 | 4/61 | Libois et al. | 179—18 |
| 3,099,718 | 7/63 | Fisher | 179—18 |

ROBERT H. ROSE, *Primary Examiner.*